US005764374A

United States Patent [19]

Seroussi et al.

[11] Patent Number: 5,764,374

[45] Date of Patent: Jun. 9, 1998

[54] SYSTEM AND METHOD FOR LOSSLESS IMAGE COMPRESSION HAVING IMPROVED SEQUENTIAL DETERMINATION OF GOLOMB PARAMETER

[75] Inventors: Gadiel Seroussi, Cupertino; Marcelo Weinberger, San Jose, both of Calif.

[73] Assignee: Hewlett-Packard Company, Palo Alto, Calif.

[21] Appl. No.: 706,010

[22] Filed: Aug. 30, 1996

Related U.S. Application Data

[60] Provisional application No. 60/011,190, Feb. 5, 1996.

[51] Int. Cl. 6 .......................... H04N 1/417; H04N 1/41; G06K 9/36

[52] U.S. Cl. .......................... 358/427; 358/426; 358/470; 358/261.2; 382/238; 382/239; 382/252; 341/65

[58] Field of Search .......................... 358/426, 427, 358/470, 261.2, 261.3; 382/232, 233, 246, 237, 238, 239, 252; 341/65

[56] References Cited

U.S. PATENT DOCUMENTS 4,749,983 6/1988 Langdon, Jr. .......................... 340/347
5,680,129 10/1997 Weinberger et al. .......................... 341/65

OTHER PUBLICATIONS

M. J. Weinberger, G. Seroussi, and G. Sapiro, "LOCO 2 I: A low complexity, Context-Based, Lossless Image Compression Algorithm," Tech. Rep. HPL-95-62, Hewlett-Packard Laboratories, Jun. 1995.
S. W. Golomb, "Run-length encodings," IEEE Trans. Inform. Theory, vol. IT-12, pp. 399-401, Jul. 1966.
R. Gallager and D. C. V. Voorhis, "Optimal source codes for geometrically distributed integer alphabets," IEEE Trans. Inform. Theory, vol. IT-21, pp. 228-230, Mar. 1975.
R. F. Rice, "Some practical universal noiseless coding techniques," Tech. Rep. Publication 79-22, JPL, Mar. 1979.
A. N. Netravali and J. O. Limb, "Picture coding: a review," Proc. IEEE, vol. 68, pp. 366-406, Mar. 1980.

*Primary Examiner*—Edward L. Coles, Sr.
*Assistant Examiner*—Mark Wallerson

[57] ABSTRACT

A lossless image compression encoder/decoder system having a context determination circuit and a code generator. The image compressor uses the context of a pixel to be encoded to predict the value of the pixel and determines a prediction error and maps the prediction error to a mapped value having a distribution suitable for Golomb encoding. The image compressor contains a context quantizer that quantizes the context of pixels. The image compressor determines a Golomb parameter based on the context and historical information gathered during the coding of an image. To avoid systematic prediction biases in an image, the image compressor adjusts the distribution of prediction residuals to a distribution suitable for Golomb coding. As it encodes a particular pixel, the encoder uses the Golomb parameter to determine a Golomb code for the prediction error and encodes that value. To decompress an image, the decompressor determines and quantizes the context of each pixel being decoded. The decompressor uses the same pixels as the compressor to determine the context. The decompressor uses the context and historical information gathered during the decompression of the image to determine a Golomb parameter for the context in which the pixel occured. The decompressor retrieves from the compressed image the code for the pixel. Using the Golomb parameter and the retrieved code, the decompressor determines the mapped value of the code. The decompressor then uses the inverse mapping to determine the error value. The decompressor uses a predictor to predict the value of the pixel based on the context and adds the error value to determine the actual value of the pixel. In one embodiment the image compressor uses an alphabet extension, embedded in its context model, in specific low gradient contexts to reduce the redundancy of the encoding.

Other systems and methods are disclosed.

59 Claims, 11 Drawing Sheets

SYSTEM AND METHOD FOR LOSSLESS IMAGE COMPRESSION HAVING IMPROVED SEQUENTIAL DETERMINATION OF GOLOMB PARAMETER

CROSS REFERENCE TO RELATED APPLICATIONS

The present application claims benefit of U.S. Provisional Application No. 60/011,190, filed Feb. 5, 1996, the entire disclosure of which is hereby incorporated herein by reference.

The present application is related to U.S. patent application Ser. No. 08/503,792 entitled "System and Method for Lossless Image Compression", filed Jul. 18, 1995, the entire disclosure of which is hereby incorporated herein by reference.

1. Technical Field of the Invention

The invention relates generally to image compression, and, more particularly, to low complexity lossless and near-lossless adaptive compression having context-specific Huffman codes.

2. Background Art

The use of compression algorithms for efficient data storage and communication has become a key component in most digital imaging systems. In many applications a reduction in the amount of resources required to store or transmit data is crucial, so that compression can be viewed as an enabling technology. Image compression algorithms are broadly classified into lossy (irreversible) schemes, for which the original pixel intensities cannot be perfectly recovered from the encoded bit stream, and lossless (reversible) schemes, for which the coding algorithms yield decompressed images identical to the original digitized images. The latter, in general, are required in applications where the pictures are subjected to further processing, e.g. for the purpose of extraction of specific information. Most lossy compression techniques are designed for the human visual system and may destroy some of the information required during processing. Thus, images from digital radiology in medicine or from satellites in space are usually compressed by reversible methods. Lossless compression is generally the choice also for images obtained at great cost, for which it may be unwise to discard any information that later may be found to be necessary, or in applications where the desired quality of the rendered image is unknown at the time of acquisition, as may be the case in digital photography. In addition, lossless may be preferred over lossy in applications where intensive editing or repeated compression/decompression are required: the accumulation of error due to a lossy iteration may become unacceptable.

Gray-scale images are considered as two-dimensional arrays of intensity values, digitized to some number of bits. In most applications 8 bits are used, although 12 bits is customary in digital radiology. Color images, in turn, are usually represented in some color space (e.g., RGB, YUV, LAB), in which each component is a gray-scale image. Thus, the tools employed in the compression of color images are derived from those developed for gray-scale images and the discussion herein will generally focus on the latter, but should be considered also applicable to color images. It should be noted though that the combination of these tools in the case of color may take into account the possible correlation between color planes (e.g., in an RGB representation).

Lossless image compression techniques often consist of two distinct and independent components: modeling and coding. The modeling part can be formulated as an inductive inference problem, in which an image is observed pixel by pixel in some pre-defined order (e.g., raster-scan). At each time instant i, and after having scanned past data $x^i=x_1x_2 \ldots x_i$, one wishes to make inferences on the next pixel value $x_{i+1}$, by assigning a conditional probability distribution to it. (Notice that pixel values are indexed with only one subscript, despite corresponding to a two-dimensional array. This subscript denotes the "time" index in the pre-defined order.) In a sequential formulation, this distribution $p(\cdot|x^i)$ is learned from the past, and the goal in the long run is to maximize the probability assigned to the entire sequence $$P(x^n) = \prod_{i=1}^{n-1} p(x_{i+1}|x^i) \quad (1)$$

where $x^0$ denotes the empty string. In the coding part of the scheme, this probability assignment could be used sequentially by an arithmetic coder to obtain a total code length of $\lceil -\log P(x^n) \rceil$ bits (hereafter, logarithms are taken to the base 2, and $\lceil x \rceil$ is used to denote the smallest integer that is not smaller than x). Arithmetic coding is described in J. Rissanen and G. G. Langdon, Jr., "Universal modeling and coding," *IEEE Trans. Inform. Theory*, vol. IT-27, pp. 12–23, January 1981. Since the conditional probability used to encode $x_{i+1}$, depends only on $x^i$ it is available to the decoder as it decodes the past string sequentially. Alternatively, in a two-pass scheme the conditional distribution can be learned from the whole image in a first pass and and some description of it must be sent to the decoder as header information. In this case, the total code length includes the length of the header. Yet, both the second encoding pass and the (single-pass) decoding are subject to the same sequential formulation.

In state-of-the-art lossless image compression schemes, the probability assignment is generally broken into the following components:

a. A prediction step, in which a deterministic value $\hat{x}_{i+1}$, is guessed for the next pixel $x_{i+1}$, based on a substring $x_{i1}x_{i2} \ldots x_{iv}$ of the available past sequence $x^i$, where v denotes the order of the predictor.

b. The determination of a context on which $x_{i+1}$, occurs. Again, this context is a function of a past subsequence $x_{i1}x_{i2} \ldots x_{iu}$ for some integer u.

c. A probabilistic model for the prediction residual (or error signal) $e_{i+1}=x_{i+1}-\hat{x}_{i+1}$, conditioned on the context of $x_{i+1}$.

FIG. 1 is a block diagram of a typical lossless image compression scheme. The shaded areas 101 and 101' represent the scanned past sequence $x^i$, on which prediction and context modeling are based, while the black dots 103 and 103' represent the pixel location currently encoded. An image 105 is input to a modeler 107. Inside the modeler 107, the image is input to a predictor 109. Based on the sequence 101 that precedes the pixel 103 a predicted value for the pixel 103 is guessed, $\hat{x}_{i+1}$. This predicted value is subtracted from the actual value to obtain the error value ($e_{i+1}=x_{i+1}-\hat{x}_{i+1}$). The errors are then modeled in an error modeler 109. The probability distribution of the error values and the error values for individual pixels are fed to a coder 111 to produce an output compressed bitstream 113.

Some of the best available published compression ratios correspond to the scheme discussed in M. J. Weinberger, J. Rissanen, and R. Arps, "Applications of universal context modeling to lossless compression of gray-scale images," *IEEE Trans. Image Processing*, Vol. 5, N. 4, April 1996, pp. 575–586, which is inspired on the ideas of universal modeling. In that method, the context for $x_{i+1}$, is built out of dynamically varying quantized versions of the differences $x_{ij}-x_{il}$, where $x_{ij}$ and $x_{ij}$ are the values of two adjacent pixels within a fixed causal template (with respect to the scanned direction) which is used as the maximum search space for the context within $x^i$. The degree of quantization is determined dynamically with a complex calculation based on an intricate database of symbol occurrence counts.

The variable sizes of the conditioning contexts are optimized based on the concept of stochastic complexity in order to prevent "overfitting" the model. In principle, larger contexts better capture the inherent "structure" of the data, as they imply more skewed distributions for the prediction residuals, which results in a better fit. However, choosing a model whose complexity is unnecessarily large (i.e., a model for which the same fit can be achieved with smaller contexts and, hence, with fewer parameters) negatively affects performance. These redundant parameters imply a "model cost," which in a sequential scheme can be interpreted as capturing the penalties of "context dilution" occurring when count statistics must be spread over too many contexts, thus affecting the accuracy of the corresponding estimates. In non-sequential (two-pass) schemes the model cost represents the code length required to encode the model parameters estimated in the first pass, which must be transmitted to the decoder.

The prediction step in Weinberger et al. is accomplished with an optimized, context-dependent linear predictor, and the modeled prediction residuals are arithmetic encoded. The resulting code length is provably asymptotically optimal in a certain broad class of processes used to model the data.

Both the modeling and coding part of the scheme of Weinberger et al. are of high complexity, due to the complex underlying data structure used for prediction and context modeling, and the required arithmetic coder. Some alternatives exist which use a fixed predictor and a non-optimized context model for the prediction residuals, with only moderate deterioration in the compression ratios obtained for some types of images (especially natural landscapes and portraits; the deterioration is more significant for medical and satellite images). One such technique is the version of the Sunset algorithm which forms the basis for a previous JPEG compression standard (described in ISO/IEC 10918-1 ITU T.81. Digital compression and coding of continuous tone still images—Requirements and guidelines, September 1993). This technique is also described in U.S. Pat. No. 4,749,983 to Langdon, entitled "Compression of Multilevel Signals."

However, the model used in these algorithms still requires arithmetic coding of prediction residuals, an operation that is considered too complex in many applications, especially in software applications and in the very frequent case in which decoding speed is crucial. Other alternatives have been designed with simplicity in mind and propose minor variations of traditional DPCM techniques (a discussion of the DPCM technique may be found in A. Netravali and J. O. Limb, "Picture coding: A review," *Proc. IEEE*, vol. 68, pp. 366–406, 1980), which include Huffman coding of prediction residuals obtained with some fixed predictor. Thus, these techniques are fundamentally limited in their compression performance by the first order entropy of the prediction residuals. Their ability to "decorrelate" the data is reduced to the prediction step, which in general cannot achieve total decorrelation.

Ideally, the prediction of the value of the current pixel $x_{i+1}$ based on its surrounding pixels that have already been processed should be done by adaptively learning a model conditioned on the local edge direction, as discussed in Weinberger et al. However, such adaptive learning is exceedingly complex.

Nevertheless, a low-complexity edge detector is desirable in order to approach the best possible predictors.

The seven fixed linear predictors proposed for the lossless JPEG scheme (as described in ISO/IEC 10918-1 ITU T.81. Digital compression and coding of continuous tone still images—Requirements and guidelines, September 1993), not only discards edge information that might be available in the causal template, but produces very different compression results depending on the selected predictor. Moreover, the best predictor depends heavily on the image.

Accordingly, it is desirable to have an image compressor that uses low-complexity predictors with some degree of edge detection.

The term "low-complexity" herein connotes an image compression system which uses predictors based on additions and shift operations, which avoids floating point arithmetics and general multiplications, and which does not use arithmetic coding. It also implies a context determination process with simple comparisons, fixed table look-ups, and no updating of complex underlying data structures. None of the above mentioned image compression schemes based on context models achieve "low-complexity" as defined herein.

Although optimal as a prefix code, a Huffman code may be far from being matched to the distribution from which it was generated, if this distribution is very skewed. At least a one-bit code word needs to be assigned to every event, so that the average per-symbol code length cannot approach the entropy of the distribution whenever one event concentrates more than half of the probability mass. This is exactly the case in contexts representing smooth regions, for which a prediction error value of 0 is extremely likely. For some images, the redundancy of the corresponding Huffman code would produce a significant deterioration of the compression ratio. In traditional (non-conditioned) Huffman codes, this problem is addressed through an alphabet extension in which blocks of data are encoded as "super-symbols." This type of alphabet extension can be viewed as a means of spreading the excess code length of the Huffman code over many symbols, thus reducing the per-symbol redundancy.

The co-pending patent application (Ser. No. 08/503,792) discloses a system and method for image compression using a two-pass image compressor. The image compressor described therein computes quantized gradients using pixels surrounding a pixel to be encoded. These quantized gradients comprise a context of the pixel to be encoded. In a first pass, Huffman tables are constructed for prediction residuals found in each such context. In a second pass these Huffman tables are used to encode the prediction residuals.

It would therefore be desirable to achieve, in one pass, the simplicity of Huffman coding with the modeling power of context conditioning while still being able to maintain skewed distributions and a per-symbol code that approaches the entropy of the distribution.

In one-pass mode, an encoder cannot tune an optimal Huffman table to each possible distribution of prediction residuals, as the encoding needs to be done "on the fly." On the other hand, it is a widely accepted observation that the distribution of prediction residuals in continuous tone images can often be approximated by a two-sided geometric distribution centered at zero. Therefore it would be desirable to have an encoder that adaptively chooses the best among a limited set of Huffman codes, matched to exponentially decaying distributions, based on past performance.

Golomb codes provide one type of encoding that may be advantageously used in coding exponentially decaying (geometric) probability distributions of nonnegative integers, i.e., distributions of the form $$Q(n)=(1-p)p^n, \text{ where } 0<p<1.$$

Golomb codes were first described in S. W. Golomb, "Run-length encodings," *IEEE Trans. Inform Theory*, vol. IT-12, pp. 399–401, July 1966, as a means for encoding nonnegative run lengths. Given a positive integer parameter m, the Golomb code $G_m$ encodes an integer $n \geqq 0$ in two parts:

1. a binary representation of n mod m, and
2. a unary representation of $\lfloor n/m \rfloor$ (hereinafter, $\lfloor x \rfloor$ is used to denote the largest integer that is not larger than x).

For part (1), an adjusted binary code is used, utilizing $\lceil \log_2 m \rceil$ bits for numbers r in the range $0 \leqq r \leqq 2^{\lceil \log_2 m \rceil} - m$, and $\lceil \log_2 m \rceil$ bits for numbers in the range $2^{\lceil \log_2 m \rceil} - m \leqq r \leqq m-1$. For part (2), the unary representation of a nonnegative integer r is defined as a sequence of r zeros followed by a one, with a length or r+1 bits.

EXAMPLE 1

For n=19, m=4, we have n mod m=3 and $\lfloor n/m \rfloor = 4$. $G_4$ encodes n as 11 00001.

For every geometric distribution, there exists a value of the parameter m such that $G_m$ yields the shortest possible average code length over all uniquely decipherable codes for the nonnegative integers. R. Gallagher and D. C. V. Voorhis ("Optimal source codes for geometrically distributed integer alphabets," *IEEE Trans. Inform. Theory*, vol. IT-21, pp. 228–230, March 1975.) disclose that the optimal value of m is given by $$m = \left\lceil \log \frac{1+\rho}{\log \rho^{-1}} \right\rfloor \quad (2)$$

Intuitively, this value of m (which approaches $1/\log_2 \rho^{-1}$ when ρ approaches 1) makes the rate of decay of the distribution $P_{G_m}(n)=2^{L(G_m(n))}$ associated with $G_m$ approach that of Q(n). L(x) denotes the length of a binary string x.

Rice (R. F. Rice, "Some practical universal noiseless coding techniques," Tech. Rep. Publication 79–22, JPL, March 1979) discussed the special case of Golomb codes with $m=2^k$. Choosing m to be a power of 2 leads to very simple encoding/decoding procedures: part (1) of the code for n consists of the k least significant bits of n, and part (2) consists of the number formed by the remaining higher order bits of n, in unary representation. The length of the encoding is $k+1+\lfloor n/2^k \rfloor$ (the simplicity of the case $m=2^k$ was already noted by Golomb, ibid).

Example 1 above shows such an encoding, with k=2. Notice that with $m=2^k$, part (1) is just the plain binary representation of n mod $2^k$, without need for an adjusted code. Herein, codes $G_m$ with $m=2^k$ are referred to as Golomb-power-of-two codes, and $G_{2^k}$ is denoted by $\Gamma_k$.

One difficulty in using Golomb codes with a two-sided geometric distribution is that the Golomb codes are applicable to encoding nonnegative integers, whereas two-sided geometric distributions contain both positive and negative data values. Therefore, it is desirable to have a mechanism for mapping integers on non-negative values and using Golomb codes.

Thus, in encoding a sequence of integer values using Golomb codes, it is necessary to determine the parameter m, or in the case of Golomb-power-of-two codes, the parameter k. The reported methods for determining these parameters follow two basic approaches.

One prior art method for determining the Golomb parameter k may be referred to as a block-oriented approach. One version of the block-oriented approach is described in R. F. Rice, "Some practical universal noiseless coding techniques—part iii," Tech. Rep. Publication 91-3, JPL, November 1991. In this block-oriented approach the image is divided into rectangular blocks of pixels (typical sizes are 6×6 or 8×8). For each block, an optimal value of the parameter k for the block is found, and is explicitly transmitted to the decoder together with the encoded block.

Another prior art method of determining the Golomb parameter k may be referred to as a sequential approach. One sequential approach is described in P. G. Howard and J. S. Vitter, "Fast and efficient lossless image compression," in *Proc. of the* 1993 *Data Compression Conference*, (Snowbird, Utah, USA), pp. 351–360, March 1993). In Howard and Vitter's sequential approach, each pixel is encoded independently, and the encoder determines the code parameter based on the values observed for previous pixels. The decoder makes the same determination, after decoding the same past sequence.

With both of these approaches, the parameter k can be determined either by exhaustive search (for b-bit pixels, at most b values of the parameter k need to be considered), or by an explicit computation. The exhaustive search is recommended by both Rice, ibid., and Howard and Vitter, ibid. Rice, ibid., describes an estimation formula based on the sum $F_0=\Sigma_x L(\Gamma_0(x))$ for pixels x in the block. The parameter k is determined according to ranges of values of $F_0$ (e.g., k=1 if $5J/2<F_0 \leqq 9J/2$, where J is the block size). Howard and Vitter, ibid., mention the possibility of estimating k by first estimating the mean and variance of the distribution over the observed sequence, and then deriving k from the mean and variance.

A drawback to the block-oriented approach in context-based modeling is that all the pixels that belong to a given context may not be contiguous in the image and, thus, cannot be easily blocked.

It is therefore desirable to have a fast and efficient sequential implementation of Golomb code encoding that attain compression performance similar or superior to block-based methods.

It is further desirable to provide a method of determining k without buffering portions of the image and saving codes in memory.

It is also desirable to determine k sequentially, without using exhaustive searching and with a low-complexity explicit calculation.

While selecting m to be a power of two ($m=2^k$) increases simplicity, such a limitation on m may not necessarily result in as good a compression as other values of m. It is therefore also desirable to determine Golomb parameters so as to optimally compress images.

SUMMARY OF THE INVENTION

It is an object of the invention to provide a low-complexity image compressor that achieves the compression ratios of complex image compressor systems.

It is an object of the invention to provide a image compressor that combines the benefits of Huffman coding with contextual modeling.

It is an object of the invention to use local gradients to determine the context of a pixel to be compressed.

It is an object of the invention to provide an encoder that adaptively chooses the best among a limited set of Huffman codes, matched to exponentially decaying distributions, based on past performance.

It is an object of the invention to compress images using Golomb codes in conjunction with a context model.

It is a further object of the invention to provide a fast and efficient process for determining the parameter for Golomb codes.

It is an additional object of the invention to quantize the context of a pixel to be compressed and use the quantized contexts to determine the Golomb code parameter.

It is another object of the invention to overcome the minimum of one-bit per pixel limitation of Huffman coding.

It is a further object of the invention to use Golomb codes to encode runs of uniform residual values.

The above and other objects of the invention are satisfied by providing a one-pass image compressor that has a context quantizer, a predictor, and a Golomb code parameter generator based on the quantized contexts. The parameter generator further determines the parameter values based on the values observed for encoding of previous pixels. The context is determined by the pixels in a template that includes previously encoded pixels. The context quantizer determines a quantized context of a pixel to be encoded. The image compressor uses the context of a pixel to be compressed to predict the value of the pixel. The image compressor compares the predicted values of each pixel with the corresponding actual value. The errors are counted with respect to the particular quantized context associated with the pixel.

A bias cancellation mechanism of the image compressor guarantees distributions of prediction errors whose average is matched to Golomb codes.

The image compressor uses the quantized context of a pixel to be coded and the determined parameter to encode the prediction error for the pixel.

On the decompression side, the decompressor also has a predictor and a context quantizer. The decompressor determines the context of a pixel to be decoded by looking to the same context template as the one used by the image compressor. The context quantizer then determines the Golomb parameter corresponding to the context of the encoded pixel and uses that parameter to decode the prediction error. The decompressor obtains a predicted value for the pixel, using previously decoded pixels in the context template, and adds the error value to the predicted value, modified by the bias cncellation mechanism, to obtain the actual pixel value.

Still other objects and advantages of the present invention will become readily apparent to those skilled in this art from the detailed description, wherein we have shown and described the preferred embodiments of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The invention is best understood by referring to the drawings accompanying this specification in which like numerals represent like elements. As a convention, elements bearing a reference numeral followed by a single or multiple apostrophes is an identical element or similar to, but a variation of, the element bearing the numeral without an apostrophe and any other elements with the same reference numeral but having a different number of apostrophes.

DETAILED DESCRIPTION OF THE DRAWINGS

1. Introduction

The present invention is a system and method for lossless compression of continuous-tone images that combines the simplicity of Huffman coding with the compression potential of context models. The preferred embodiment of the present invention uses a subclass of Huffman codes, Golomb codes, for coding prediction errors. The compressor of the present invention is based on a fixed context model, but is tuned for efficient performance in conjunction with context-conditioned Golomb codes. The use of Golomb coding in conjunction with context-conditioning provides the advantage of requiring the determination of only one parameter for each context. This fact allows for larger numbers of contexts than used with other Huffman code based compression schemes, e.g., the image compressor/decompressor described in U.S. patent application Ser. No. 08/503,792 entitled "System and Method for Lossless Image Compression", filed Jul. 18, 1995.

An additional fundamental limitation of Huffman codes is that they require a minimum code length of one bit per encoding, which may produce a significant deterioration in the compression ratio for contexts with very skewed distributions.

By addressing and finding a solution to the above problems, the present invention attains, at low complexity, compression ratios similar or superior to those obtained with more complex codes based on arithmetic coding, e.g., the family of Sunset coders (U.S. Pat. No. 4,749,983). In particular, as discussed below, the present invention, as implemented in LOCO-$I_{1P}$ (an image compressor developed at Hewlett-Packard Laboratories) proves to have superior compression performance than the JPEG independent lossless compression system at a lower level of complexity. LOCO-$I_1$P also attains favorable results both in terms of execution speed and compression performance as compared to the CALIC-Huffman algorithm (X. Wu, N. Memon, and K. Sayood, "A context-based, adaptive, lossless/nearly-lossless coding scheme for continuous-tone images (CALC)," A proposal submitted in response to the Call for Contributions for ISO/IEC JTC 1.29.12, July 1995).

Figure 1:
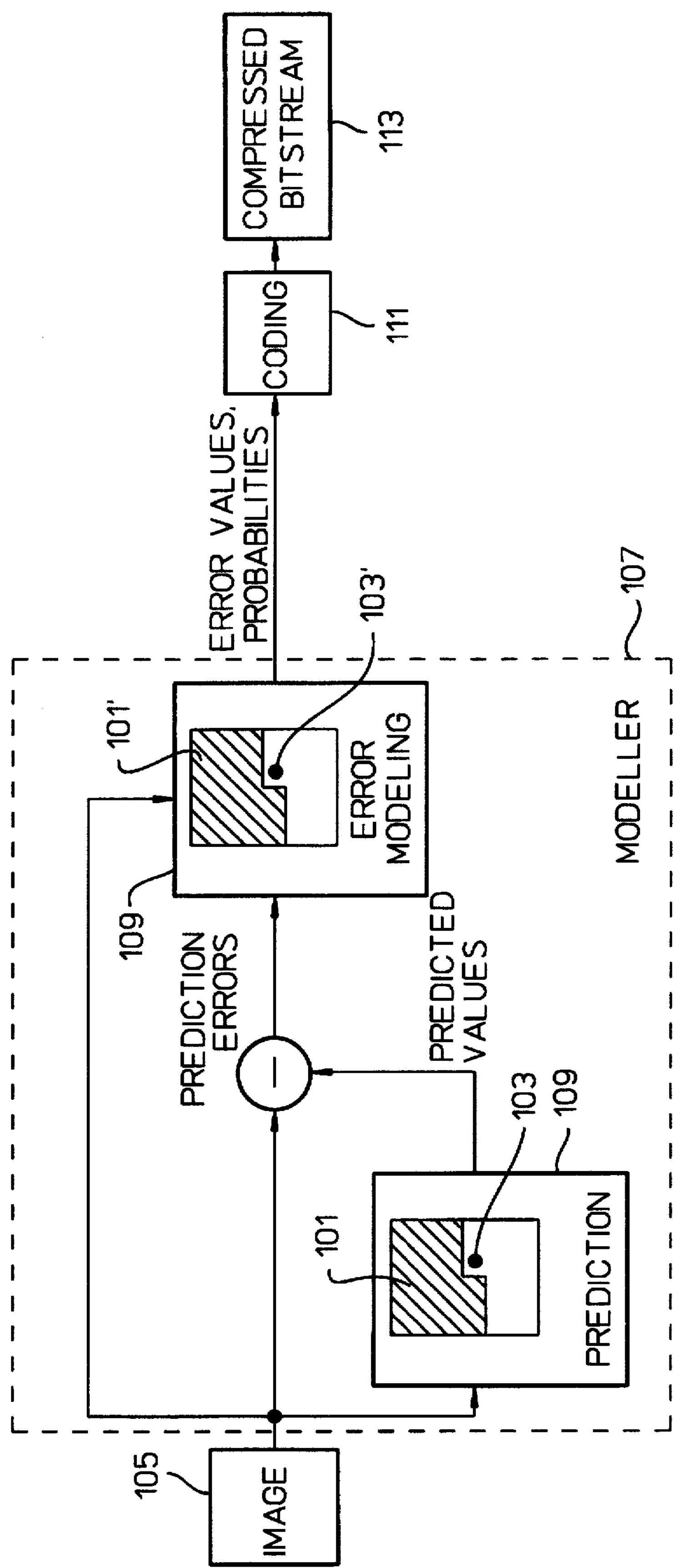
FIG. 1 is a block diagram of a typical lossless image compression scheme.
Figure 2:
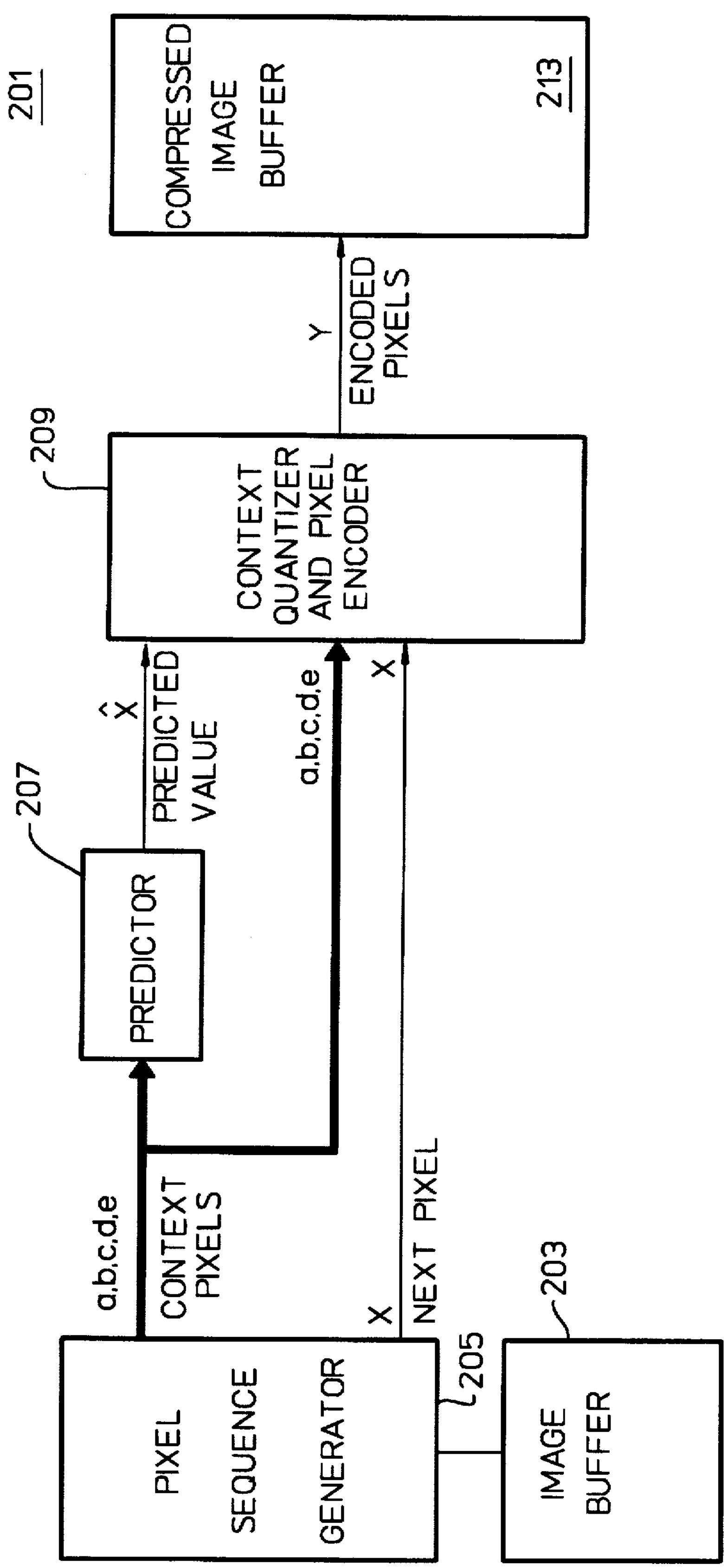
FIG. 2 is a block diagram of an image compressor system according to a preferred embodiment of the present invention.

FIG. 2 is a block diagram of an image compressor system 201 according to a preferred embodiment of the present invention. Uncompressed images are stored in an image buffer 203. The image buffer is connected to a pixel sequence generator 205. The pixel sequence generator 205 is connected to a predictor 207 and to a context quantizer and pixel encoder 209. The predictor 207 operates to determine a predicted value for the pixel currently being processed, using its context. The total number of possible contexts can be quite large. The context quantizer 209 operates to classify a particular context as being one in a set of quantized contexts.

The image compressor 201 operates as a one-pass sequential encoding system. The context quantizer and pixel encoder 209 determines the context of the pixel to be encoded. The context quantizer 209 uses that quantized context to determine the Golomb parameter (m for embodiments using the general Golomb code and k for embodiments using Golomb-power-of-two codes). This parameter is then transmitted back to the pixel encoder 209 which uses it to encode the prediction residual. These encoded residuals are then stored in an output buffer 213, e.g., a disk drive, a diskette, or transmitted via a network to an image server. The encoded image may then be decoded by an image decoder, such as the one shown in the block diagram of FIG. 8.

2. Pixel sequence Generator 205

Figure 3:
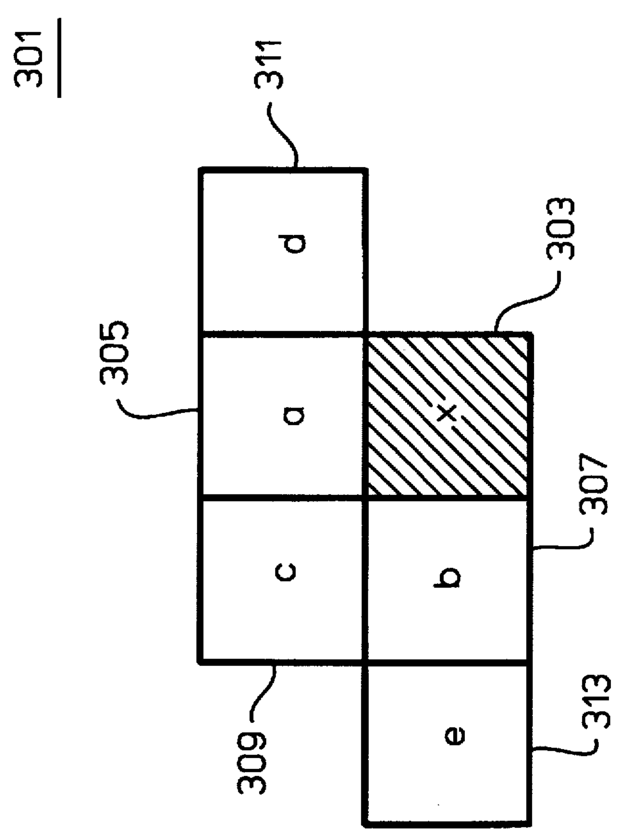
FIG. 3 is a graphic depiction of a causal template used by the present invention.

The pixel sequence generator 205 outputs a number of context pixels from a causal template to the predictor 207. FIG. 3 is a graphic depiction of a causal template 301 output by the pixel sequence generator 205 of the present invention. Element 303, a pixel having the value x, is the pixel currently being processed. In the template 301, the value of the "North" pixel 305 (the pixel above the current pixel 303) is denoted by a, the value of the "West" pixel 307 (the pixel on the left) is denoted by b, while the values of the "NW" (pixel 309) and "NE" (pixel 311) pixels (the pixels on the diagonals) are denoted by c and d, respectively. The causal template 301 also contains the pixel 313 immediately to the "west" of pixel 307. The pixel 313 is denoted by e. The "East" pixel is not used, because it is unavailable to the decoder as it decodes the code string sequentially. Of course, a, b, c, d, and e depend on the time index i, but this dependence has been deleted from the notation for simplicity.

3. Prediction

The predictor 207 of the image compression system 201 employs a simple test to detect vertical or horizontal edges. If an edge is not detected, then the guessed value is a+b−c, as this would be the value of $x_{i+1}$, if a plane passes through the N, W, and NW pixel locations, with respective heights a, b, and c, and the current pixel is constrained to belong to the same plane. This constraint expresses the fact that the image is expected to be smooth in the absence of edges. Specifically, the predictor 207 guesses:

$$\hat{x}_{i+1} \equiv \begin{cases} \min(a, b) & \text{if } c \geq \max(a, b) \\ \max(a, b) & \text{if } c \leq \min(a, b) \\ a + b - c & \text{otherwise} \end{cases} \quad (3)$$

Assuming, without loss of generality, that a≦h, then the predictor of (3) can be interpreted as picking α in many cases where a vertical edge exists left of the current location, b in many cases of an horizontal edge above the current location, or a plane predictor (i.e., smoothness is assumed) if no edge has been detected.

As shown in FIG. 2, the pixel sequence generator 205 and predictor 207 provide the context quantizer and pixel encoder 209 with the next pixel to be encoded x and the predicted value $\hat{x}$ based on the context.

4. Context determination and pixel encoding

Figure 4:
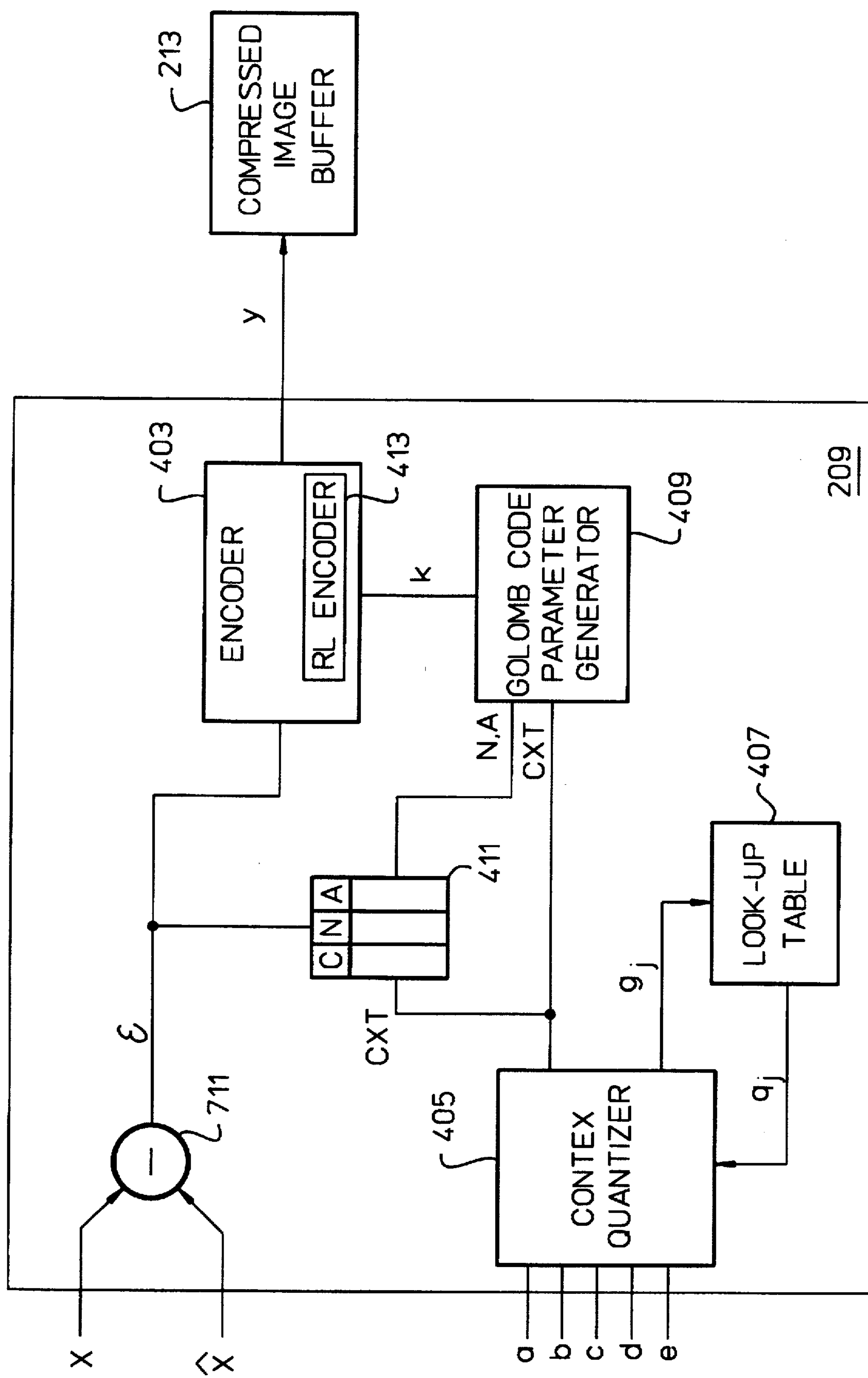
FIG. 4 is a block diagram of the context quantizer and pixel encoder of the image compressor system of FIG. 2.

FIG. 4 is a block schematic diagram of the context quantizer and pixel encoder 209. x and $\hat{x}$, from the pixel sequence generator 205 and the predictor 207, respectively, are compared using subtract or 401 and the resulting residual ε is input to encoder 403.

The context model of the preferred embodiment conditions the encoding of the prediction residual for the current pixel 303 based on the differences $g_1=d-a$, $g_2=a-c$, $g_3=c-h$, and $g_4=b-e$.

These differences represent the local gradient and, thus, are a measure of the level of activity (smoothness, edginess) surrounding a pixel, which in turn governs the statistical behavior of prediction errors.

Each difference $g_j$ is quantized into a small number of regions. In the preferred embodiment $g_1$, $g_2$, and $g_3$ are quantized into nine regions each. These regions are controlled by three positive threshold parameters $S_, S_2$, and $S_3$, as tabulated in Table 1:

TABLE 1

| Quantization regions for differences $g_1$, $g_2$, and $g_3$. | |
|---|---|
| Region −4: | $g_j \leq -S_3$. |
| Region −3: | $-S_3 + 1 \leq g_j \leq -S_2$. |
| Region −2: | $-S_2 + 1 \leq g_j \leq -S_1$. |
| Region −1: | $-S_1 + 1 \leq g_j \leq -1$, |
| Region 0: | $g_j = 0$, |
| Region 1: | $1 \leq g_j \leq S_1 - 1$. |
| Region 2: | $S_1 \leq g_j \leq S_2 - 1$. |
| Region 3: | $S_2 \leq g_j \leq S_3 - 1$. |
| Region 4: | $S_3 \leq g_j$. |

Difference $g_4=b-e$, is obtained from sample position 313, which is farther away from the predicted pixel, and it is therefore quantized more coarsely into three regions, which are determined by a threshold parameter T as follows:

TABLE 2

| Quantization regions for difference $g_4$. | |
|---|---|
| Region −1: | $g_4 \leq -T$, |
| Region 0: | $-T + 1 \leq g_4 \leq T - 1$ |
| Region 1: | $T \leq g_4$ |

Thus, the pixel values that form the causal template 301, a, b, c, d, e, are input to the context quantizer 405. The context quantizer computes the values $g_j$ and uses these values to look up the corresponding $q_j$ values, j=1, 2, 3, and 4, i.e., the quantization indices, in the look-up table 407.

Each quantized context is represented by a four-dimensional vector $[q_1, q_2, q_3, q_4]$. In principle, this would lead to a total of $9^3*3=2187$ quantized contexts. However, it is reasonable to assume that, by symmetry, $$\text{Prob}\{\epsilon_{i+1}=D|C_i[q_1, q_2, q_3]\}=\text{Prob}\{\epsilon_{i+1}=-D|C_i=[-q_1, -q_2, -q_3]\}$$

where $C_i$ represents the context triplet $[q_1, q_2, q_3]$ at time i. Using this equality, the image compressor 201 reduces the number of contexts to $((9^3-1)/2+1)*3=1095$, as described below.

For each non-zero three-dimensional vector $[q_1, q_2, q_3]$, there is a vector with the same magnitude but exactly opposite orientation. The corresponding contexts represented by $[q_1, q_2, q_3, q_4]$ and $[-q_1, -q_2, -q_3, -q_4]$ are considered a quantized-context pair, and in one embodiment of the image compressor 201 these two contexts are processed together for the purpose of sequentially and adaptively computing the Golomb parameter and for bias cancellation (described below). When merging opposite contexts, the encoded value for pixels occurring at one of the components of the quantized-context pair is actually the opposite of the prediction residual.

5. Context Modeling

As discussed above, the distribution of prediction residuals in continuous tone images can often be approximated by a two-sided geometric distribution, i.e. a two-sided exponential decay centered at zero. In principle, a prediction residual can take on any value in the range $-(\alpha-1)\leqq\epsilon\leqq\alpha-1$, where a is the size of the input alphabet (e.g., $\alpha=256$ for 8-bit pixels). Actually, given the predicted value $\hat{x}$ (known to both the encoder and decoder), $\epsilon$ can take on only $\alpha$ possible different values. One way to exploit this property is to take the actual value of the prediction residual and reduce it modulo $\alpha$ to a value between $-\alpha/2$ and $\alpha/2-1$. This has the effect of remapping large prediction residuals, which have very low probability in smooth images, to small prediction residuals. Thus, the "tails" of the distribution are merged with its central part, without significantly affecting the two-sided geometric-like behavior of the central part. The regions most affected are those near the new "tails" (i.e. error magnitudes close to $\alpha/2$); however, in practical situations, the assumption of a two-sided geometric distribution in those regions may be questionable to start with, due to the very low probabilities involved, and the sparsity of samples in that part of the histogram.

The above remapping is also advantageous in some compound images containing a mixture of smooth regions and regions with many sharp transitions (e.g. black and white text). In this case, the distribution of prediction residuals before remapping contains two additional peaks, one at $-(\alpha-1)$, and one at $\alpha-1$. After remapping, these peaks are merged with the center of the distribution, making the distribution more similar to a two-sided geometric distribution. When $\alpha=2^\beta$, the remapping consists of just taking the least significant $\beta$ bits of $x-\hat{x}$, and interpreting them in 2's complement representation.

Other remappings are possible, which might give a slight compression advantage for smooth images (see, e.g. R. F. Rice, "Some Practical universal noiseless coding techniques—part iii," Tech. Rep. Publication 91-3, JPL, November 1991). However, these remappings have a complexity cost, and they do not have the above mentioned advantage for compound documents.

Hereinafter, for illustrative purposes, we assume that prediction residuals $\epsilon$ are in the range $-\alpha/2\leqq\epsilon\leqq\alpha/2-1$, and their distribution is assumed to be two-sided geometric centered at zero.

6. Mapping of error residuals

Golomb codes are useful for coding geometric distributions of positive integers. However, the distribution of prediction residuals is a two-sided geometric distribution centered at 0. Therefore, the encoder 705 maps the residuals such that the negative integers can be encoded, step 803. The encoder 705 uses the following mapping of prediction residuals $\epsilon$ in the range $-\alpha/2\leqq\epsilon\leqq(\alpha/2-1)$ to values $M(\epsilon)$ in the range $0\leqq M(\epsilon)\leqq\alpha-1$:

$$M(\epsilon)=\begin{cases}2\epsilon & \epsilon\geqq 0,\\ 2|\epsilon|-1 & \epsilon<0\end{cases} \tag{4}$$

The mapping $M(\epsilon)$ orders prediction residuals, interleaving negative values and positive values in the sequence 0,−1,1,−2,2, . . . (Of course, without knowing which of −i and i is more probable, whether −i precedes i, or vice versa, is entirely arbitrary). If the values $\epsilon$ follow a two-sided geometric distribution centered at zero, then the distribution of values $M(\epsilon)$ will be close to (but not exactly) geometric, which can then be encoded using an appropriate Golomb code.

7. Determination of the Golomb Parameter

The quadruple $[q_1, q_2, q_3, q_4]$ which is the quantized context is input to the Golomb parameter computation unit 409 to compute the Golomb parameter m. In the preferred embodiment the Golomb-power-of-two codes, where $m=2^k$, are used. Hence in the preferred embodiment the Golomb parameter k is determined by unit 409.

The parameter computation unit 409 computes k according to the formula:

$$k=\left\lceil \log_2\left(\frac{A}{N}\right)\right\rceil \tag{5}$$

which may be rewritten as:

$$k=\min\{k'|2^{k'}N\geqq A\} \tag{6}$$

N and A are two variables that the encoder and decoder maintain for each context. N is a count of prediction residuals seen so far in the context during the encoding or decoding process. A is the accumulated sum of magnitudes of prediction residuals seen so far in the context. N and A may for example be stored in a table 411 and accessed by the parameter computation unit. The derivation of equations (5) and (6) is described below.

In a software embodiment of the present invention equation (6) may be implemented using the following C-language "one-liner:"

```
for (k=0; (N<<k)<A; k++);
```

In other words, k is equal to the number of times one has to left-shift N to equal or exceed A. In an alternative embodiment, equation (6) is implemented using hardware shift registers.

Figure 6:
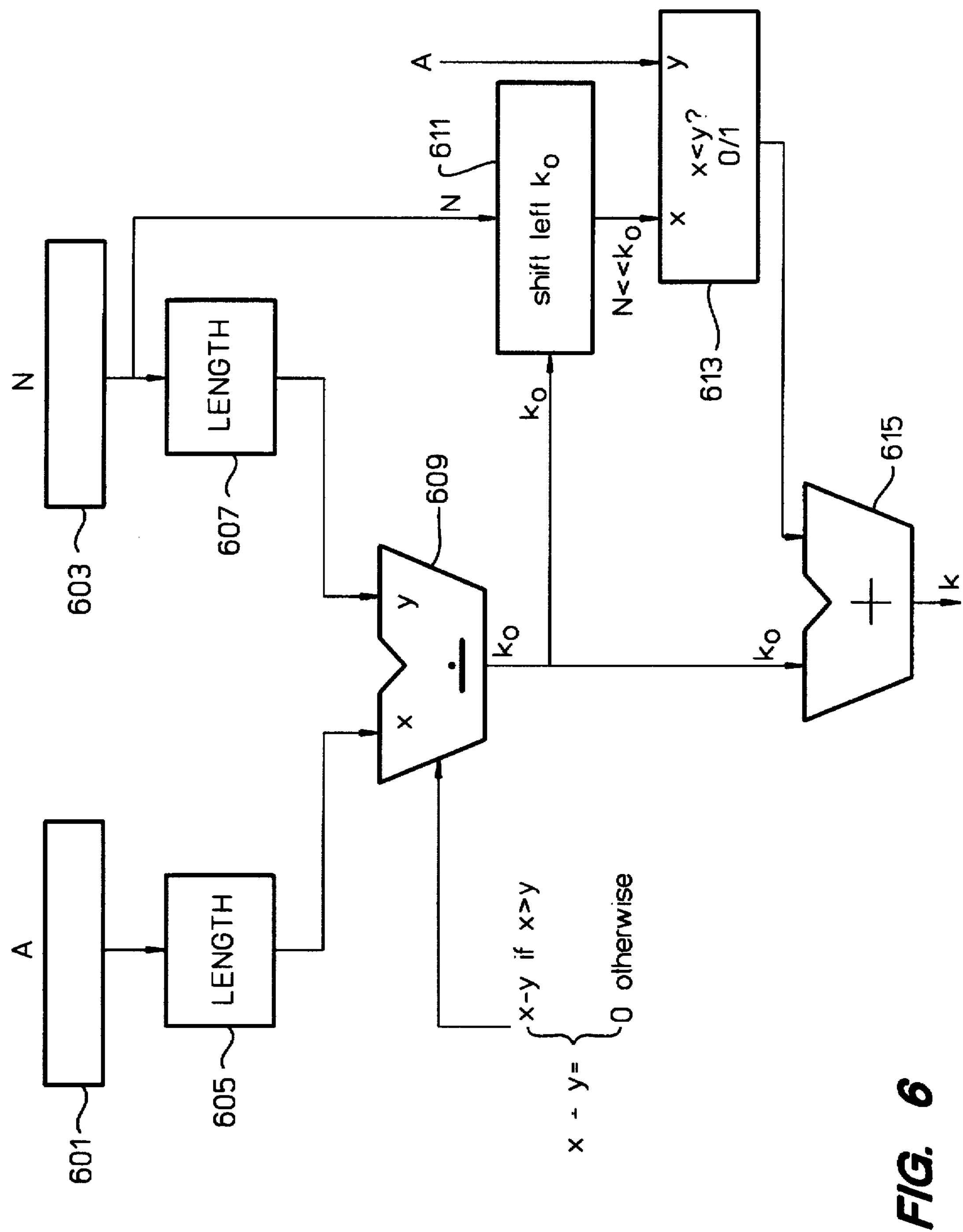
FIG. 6 is a logic circuit diagram of a Golomb-power-of-two parameter determination circuit according to the invention.

FIG. 6 is a block schematic diagram illustrating a circuit for determining the Golomb parameter k. The circuit determines how many positions, $k_0$, that N must be left-shifted to be the same binary length as A ("binary length" is the number of significant bits from the left most "1" to the right). N is then left-shifted that number, $k_0$, of positions. The resulting quantity is then compared to A. If A is larger than N left-shifted $k_0$ positions, k is set to be $k_0$ plus one. Otherwise, k is set to $k_0$.

Two registers 601 and 603 are used to store the quantities A and N, respectively. Logic 605 determines the length of A, and logic 607 determines the length of N. A comparator/subtractor 609, determines $k_0$ according to the following equation:

$$k_0=\begin{cases}x-y, & \text{if } x>y\\ 0, & \text{otherwise}\end{cases} \tag{7}$$

The N is transmitted from the register 603 to a shift register 611. The output from comparator/subtractor 609, $k_0$, is then used to control a shift register 611, such that the quantity N is left shifted $k_0$ positions. The resulting quantity, $N<<k_0$, is then compared to A by comparator 613, which produces a logic value equal to $(N<<k_0)<A$, i.e., 1 if $(N<<k_0)<A$, 0 otherwise. That logic value is added, by adder 615, to $k_0$ to produce the resulting Golomb parameter k.

The variables N and A are stored in a table 411 having a value for N and for A for each context CXT. For each pixel processed, N and A, corresponding to the context CXT for that pixel, are updated. N is a running count of pixels in the context CXT and A is the accumulated sum of magnitudes of the prediction residuals encountered in the context CXT up to the processing of the pixel being encoded.

8. Generation of Generalized Golomb Codes

In the embodiment described above, m is restricted to $m=2^k$, where k is an integer in the range $0\leqq k\leqq \beta-1$, where $\beta$ is the number of bits per symbol. Thus, for within an allowed range of values for m, e.g., 0 to 128, a subset of the possible m values are selected for consideration for encoding prediction residuals. The advantage of only using the Golomb-power-of-two parameters is that the computation of k, and consequently m, is computationally inexpensive. However, by using a reduced universe for valid m values, there is a higher likelihood of not achieving an optimal compression.

In an alternative embodiment, a larger universe for valid m values is used, namely:

$$m \approx (\sqrt{2})^{k'} \tag{8}$$

where ≈ means "approximately equal to" and is taken to be either the next larger integer value (ceiling) or next smaller integer value (floor). k' is computed by setting $N'=N^2$ and $A'=A^2$, where N and A are defined as above in the section "Determination of Golomb Parameter." k' is computed by the C language statement:

```
for (k'=0; (N'<<k')<A'; k'++);
```

Here k' is an integer in the range $0<k'<2\beta-1$. The advantage of this alternative embodiment is that it provides a richer subfamily of Golomb codes from which to choose ($2\beta$ codes, including the original $\beta$ Golomb-power-of-two codes), while still preserving a simple parameter determination procedure. This computation of k' may be achieved using a circuit substantially the same as the circuit shown in FIG. 6, with circuitry added to compute A' and N' from A and N.

Many further alternative embodiments are possible by obtaining a family of $q\beta$ codes, where q is a positive integer by setting $N'=N^q$ and $A'=A^q$.

9. Local adaptation

To enhance adaptation to local image variations, and general non-stationarity of image statistics, the variables N and A are periodically reset. Specifically, the contents of N and A for a given context are halved each time N attains a predetermined threshold $N_0$. In this way, the immediate past is given a larger weight than the remote past. Notice that this "vanishing memory" effect achieves the local adaptation characteristics of block-oriented schemes, while maintaining sequentiality. In the preferred embodiment, values of $N_0$ between 64 and 256 work well for typical images. Having $N_0<256$ guarantees that the variable N can be held in one byte of memory.

10. Coding

Having obtained the Golomb parameter k from the Golomb code parameter generator 409, the encoder 403 encodes the residual $\epsilon$.

Figure 5:
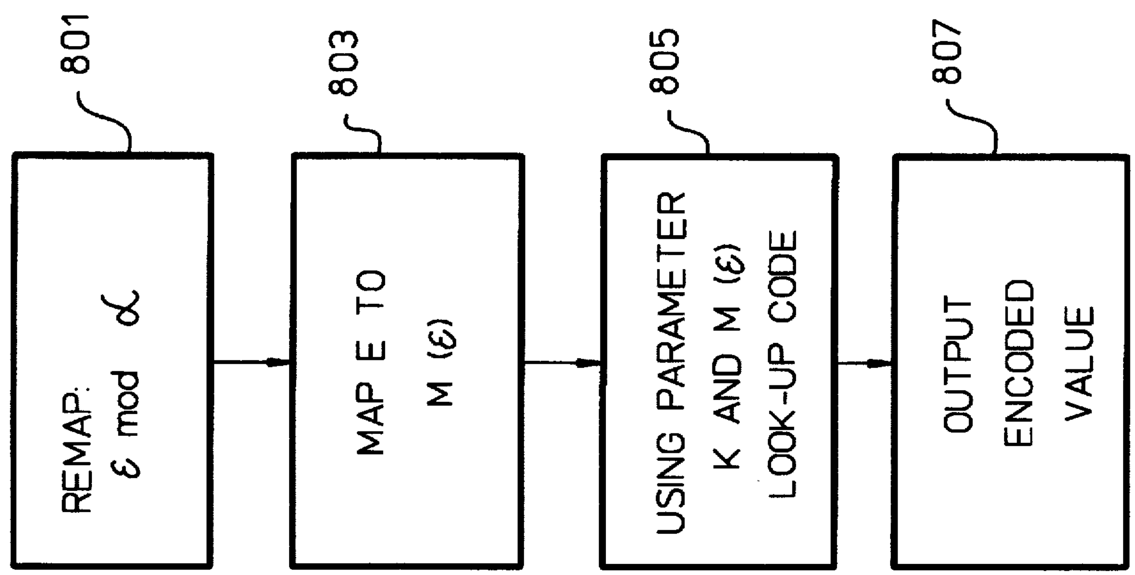
FIG. 5 is a flow diagram of the encoding procedure used by the encoder of FIG. 4.

FIG. 5 is a flow-chart of the procedure used by the encoder to derive the code for a given prediction residual.

A first step is to take the actual value of the prediction residual and reduce it modulo $\alpha$ to a value between $-\alpha/2$ and $\alpha/2-1$, step 801. The value $\epsilon$ is then mapped using the mapping $M(\epsilon)$, step 803.

In the embodiment of the invention shown in FIG. 4, the encoder computes the Golomb code from a Golomb code parameter generator 409, step 805. Table 3 below shows an example of a partial code table for prediction residuals using $M(\epsilon)$ and the Golomb code $\Gamma_2$ (e.g., k=2):

TABLE 3

Example of a partial Golomb code table

| $\epsilon$ | $M(\epsilon)$ | Code | $\epsilon$ | $M(\epsilon)$ | Code |
|---|---|---|---|---|---|
| 0 | 0 | 00 1 | −5 | 9 | 01 001 |
| −1 | 1 | 01 1 | 5 | 10 | 10 001 |
| 1 | 2 | 10 1 | −6 | 11 | 11 001 |
| −2 | 3 | 11 1 | 6 | 12 | 00 0001 |
| 2 | 4 | 00 01 | −7 | 13 | 01 0001 |
| −3 | 5 | 01 01 | 7 | 14 | 10 0001 |
| 3 | 6 | 10 01 | −8 | 15 | 11 0001 |
| −4 | 7 | 11 01 | 8 | 16 | 00 00001 |
| 4 | 8 | 00 001 | . . . | . . . | . . . |

The complete code table would contain one code for each prediction residual $\epsilon$ for each Golomb parameter k. Each code value in the code table may be derived using the definition for Golomb codes. Therefore, in the preferred embodiment of the invention, the pixel encoder 209 does not explicitly store code tables, but derives the code for each pixel using the Golomb code definition.

As discussed above, given a positive integer parameter m, a Golomb code $G_m$ encodes an integer $n\geqq 0$ in two parts:

1. a binary representation of n mod m, and
2. a unary representation of $\lfloor n/m\rfloor$.

For part (1), an adjusted binary code is used, utilizing $\lfloor \log_2 m\rfloor$ bits for numbers r in the range $0\leqq r\leqq 2^{\lceil \log_2 m\rceil}-m$, and $\lceil \log_2 m\rceil$ bits for numbers in the range $2^{\lceil \log_2 m\rceil}-m\leqq r\leqq m-1$. For part (2), the unary representation of a nonnegative integer r is defined as a sequence of r zeros followed by a one, with a length or r+1 bits.

In the preferred embodiment m is a power of 2, i.e., $m=2^k$. As discussed above, choosing m to be a power of two leads to very simple encoding/decoding procedures, namely, part (1) of the code for n consists of the k least significant bits of n, and part (2) consists of the number formed by the remaining higher order bits of n, in unary representation. The length of the encoding is $k+1+\lfloor n/2^k\rfloor$.

Having obtained the code corresponding to the prediction residual $\epsilon$ and the parameter k, the encoder 403, outputs the code to the compressed image buffer 213, step 807.

11. Bias cancellation

The use by the encoder 403 of Golomb codes on the remapped errors $M(\epsilon)$ relies on the distribution of prediction residuals being a two-sided, symmetric, geometric distribution centered at zero. While these assumptions are usually satisfied in the case of memoryless models, the situation is quite different in the case of context-based models, where systematic, context-dependent biases in the prediction residuals are not uncommon. These systematic biases can produce a very significant deterioration in the compression performance of a Golomb coder.

To alleviate the effect of systematic biases, an alternative embodiment provides for error feedback aimed at "centering" the distributions of prediction residuals. Specifically, for each context, a variable B that accumulates the (signed) prediction errors encoded so far in the context, a count N of context occurrences, and a correction value C, which is added to the predicted value $\hat{x}$ to offset a possible prediction bias, are maintained. If B is the accumulated prediction error before correction, then C could be computed as the average An alternative embodiment is based on prediction residuals after correction, which are accumulated in B. In this case, the correction value C is initialized to zero, and it is adjusted, for each occurrence of the context, according to the procedure shown in Table 4:

TABLE 4

Closed loop bias cancellation

```
if (B ≦ -N/2) {
C = C - 1;
B = B + N;
}
else if(B > N/2) {
C = C + 1;
B = B - N;
}
x̂ = x̂ + C;     /* correct predicted value */
ε = x - x̂;     /* compute prediction residual */
B = B + ε,     /* accumulate prediction residual */
N = N + 1;     /* update occurrence counter */
```

The procedure increments (resp. decrements) the correction value C each time the corrected prediction residual averages 0.5 or more (resp. −0.5 or less). When C is adjusted, the accumulated corrected error B is also adjusted to reflect the change in C. This procedure will tend to produce average prediction residuals in the interval (−0.5,0.5]. The procedure has the additional advantage of not requiring divisions, as in the embodiment based on equation (9). Moreover, it performs a "moderate" correction, as the value of C changes by one unit at most every iteration.

Similarly to the local adaptation of the Golomb parameter determination procedure, the bias cancellation mechanism can adapt to local variations by periodically resetting (e.g., halving) the variables B and N. In fact, the resets for both mechanisms can occur at the same time, and the variable N can be the same as the one used for the parameter estimation.

A bias cancellation provides a mechanism for dealing with another drawback of Golomb encoding of prediction residuals. Namely, due to the order imposed by the mapping $M(\epsilon)$, the coder may assign a shorter code length to a negative value than to its positive counterpart. This results in the code actually being better matched with a probability distribution with average −1/2 for k>0, and −2/9 for k=0.

To better match the actual distribution of corrected prediction errors to the code, the bias cancellation calculation is modified, when k>0, so that it produces average corrected prediction residuals in the interval (−1,0]. This is accomplished by adjusting C as shown below in Table 5:

TABLE 5

Bias cancellation adjusted for asymmetry of M(ε)

```
if(B ≦ -N) {
 C = C - 1;
 B = B + N;
}
else if(B > 0) {
 C = C + 1;
 B = B - N;
}
```

A similar modified procedure can be used for k=0, producing average corrected residuals in an interval centered at −2/9.

Figure 7:
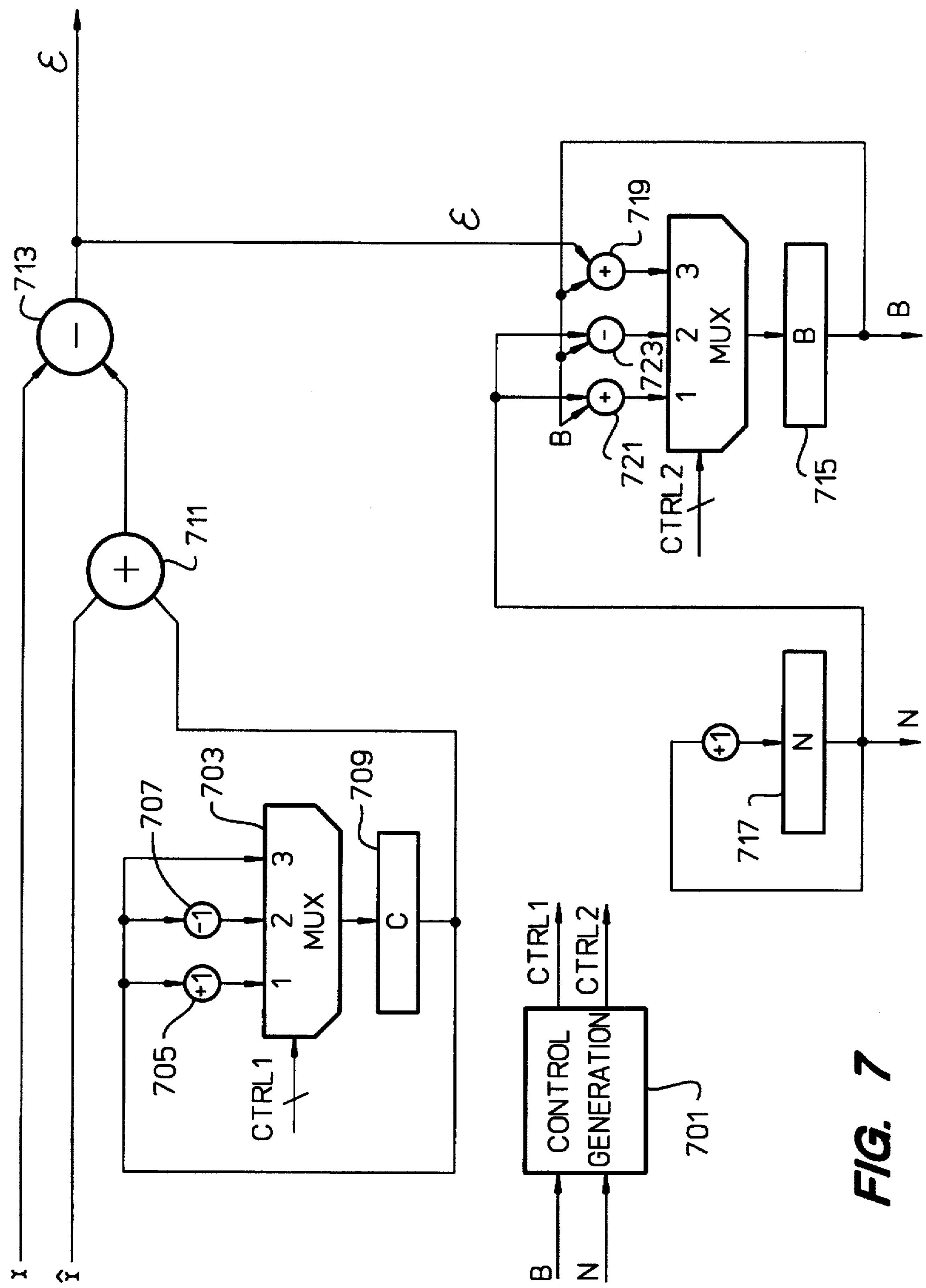
FIG. 7 is a bias cancellation circuit according to the invention.

FIG. 7 is a circuit schematic of the bias cancellation circuitry according to this alternative embodiment for centering the distribution in the interval (−1,0]. A control signal generation circuit 701 produces two control signals CTRL1 and CTRL2 based on the following conditions:

$$B \leqq -N: CTRL1=CTRL2=2$$

$$B>0: CTRL1=CTRL2=1$$

$$\text{otherwise}: CTRL1=CTRL2=3$$

A multiplexer 703, controlled by the CTRL1 signal, in combination with an incrementer 705 and a decrementer 707, either leaves untouched, or increments, or decrements the contents of a C register 709.

The quantity C from the register 709 is added, by adder 711, to the predicted value $\hat{x}$, prior to the computation of the prediction residual $\epsilon$ by the subtractor 713. The prediction residual is then input to the encoder 705, as shown in FIG. 4.

The error residual $\epsilon$ is also input to circuitry for updating the control parameters B. B is stored in a register 715. B is incremented by the quantity $\epsilon$ by adder 719, from subtractor 713, if CTRL2 is 3; if CTRL2 is 1, B is incremented (by adder 721) by the quantity N which is stored in a register 717; and if CTRL2 is 2, B is decremented (by subtractor 723) by the quantity N. N, which is stored in register 717, is incremented once for each pixel processed.

12. Derivation of Equations (5) and (6)

Consider a discrete two-sided geometric distribution $$P(\epsilon)=p_0\gamma^{|\epsilon|} \tag{10}$$

for prediction residuals $\epsilon$ in the range $-\alpha/2 \leqq \epsilon \leqq \alpha/2-1$. In the context of the present invention, $0<\gamma<1$, and $p_0$ is such that the distribution sums to 1.

The expected prediction residual magnitude is given by $$a_{\gamma,\alpha} \triangleq E[|\epsilon|] = \sum_{\epsilon=-\alpha/2}^{\alpha/2-1} p_0\gamma^{|\epsilon|}|\epsilon| \tag{11}$$

There is a relationship between $\alpha_{\gamma,\alpha}$ and the average code length $L_{\gamma,k}$ resulting from using $\Gamma_k$ on the mapped prediction errors $M(\epsilon)$. Therefore, an objective in selecting a value for k is to select such a value of k that yields the shortest average code length.

Accurate estimates for k have been obtained by investigating the relationship between $\alpha_{\gamma,\alpha}$ and k numerically on a computer. The results, for $\alpha$=256, are given in Table 6, below. Table 6 also lists the average code lengths obtained when k is, respectively, one less or more than the optimum. The latter values are used to estimate the code length penalty incurred by under- or over-estimating the value of k.

TABLE 6

Optimal values of k

| $\alpha_{\gamma,256}$ | $\gamma$ | k | $L_{\gamma,k}$ | $L_{\gamma,k-1}$ | $L_{\gamma,k+1}$ | $\alpha_{\gamma,256}$ | $\gamma$ | k | $L_{\gamma,k}$ | $L_{\gamma,k-1}$ | $L_{\gamma,k+1}$ |
|---|---|---|---|---|---|---|---|---|---|---|---|
| 0.50 | 0.236 | 0 | 1.809 | n/a | 2.309 | 15.00 | 0.936 | 4 | 6.417 | 7.269 | 6.524 |
| 0.60 | 0.277 | 0 | 1.983 | n/a | 2.383 | 16.00 | 0.939 | 4 | 6.537 | 7.513 | 6.580 |
| 0.70 | 0.315 | 0 | 2.160 | n/a | 2.460 | 17.00 | 0.943 | 5 | 6.636 | 6.657 | 7.178 |
| 0.80 | 0.351 | 0 | 2.340 | n/a | 2.540 | 18.00 | 0.946 | 5 | 6.692 | 6.775 | 7.200 |
| 0.90 | 0.384 | 0 | 2.523 | n/a | 2.623 | 19.00 | 0.949 | 5 | 6.748 | 6.892 | 7.223 |
| 1.00 | 0.414 | 0 | 2.707 | n/a | 2.707 | 20.00 | 0.951 | 5 | 6.803 | 7.008 | 7.247 |
| 1.10 | 0.442 | 1 | 2.793 | 2.893 | 3.243 | 21.00 | 0.954 | 5 | 6.874 | 7.155 | 7.277 |
| 1.20 | 0.468 | 1 | 2.881 | 3.081 | 3.281 | 22.00 | 0.956 | 5 | 6.932 | 7.276 | 7.302 |
| 1.30 | 0.492 | 1 | 2.970 | 3.270 | 3.320 | 23.00 | 0.958 | 5 | 6.991 | 7.398 | 7.327 |
| 1.40 | 0.515 | 1 | 3.060 | 3.460 | 3.360 | 24.00 | 0.960 | 5 | 7.049 | 7.518 | 7.353 |
| 1.50 | 0.535 | 1 | 3.151 | 3.651 | 3.401 | 25.00 | 0.962 | 5 | 7.107 | 7.638 | 7.379 |
| 1.60 | 0.554 | 1 | 3.243 | 3.843 | 3.443 | 26.00 | 0.964 | 5 | 7.165 | 7.757 | 7.405 |
| 1.70 | 0.572 | 1 | 3.336 | 4.036 | 3.486 | 27.00 | 0.965 | 5 | 7.222 | 7.874 | 7.430 |
| 1.80 | 0.588 | 1 | 3.430 | 4.230 | 3.530 | 28.00 | 0.967 | 5 | 7.291 | 8.015 | 7.461 |
| 1.90 | 0.604 | 1 | 3.524 | 4.424 | 3.574 | 29.00 | 0.968 | 5 | 7.350 | 8.136 | 7.488 |
| 2.00 | 0.618 | 1 | 3.618 | 4.618 | 3.618 | 30.00 | 0.970 | 5 | 7.408 | 8.255 | 7.515 |
| 2.20 | 0.644 | 2 | 3.708 | 3.808 | 4.208 | 31.00 | 0.971 | 5 | 7.466 | 8.373 | 7.541 |
| 2.40 | 0.667 | 2 | 3.800 | 4.000 | 4.246 | 32.00 | 0.972 | 5 | 7.524 | 8.491 | 7.568 |
| 2.60 | 0.687 | 2 | 3.893 | 4.193 | 4.286 | 33.00 | 0.973 | 5 | 7.591 | 8.629 | 7.599 |
| 2.80 | 0.705 | 2 | 3.987 | 4.387 | 4.327 | 34.00 | 0.974 | 6 | 7.626 | 7.649 | 8.161 |
| 3.00 | 0.721 | 2 | 4.081 | 4.581 | 4.370 | 35.00 | 0.976 | 6 | 7.652 | 7.707 | 8.170 |
| 3.20 | 0.735 | 2 | 4.176 | 4.776 | 4.413 | 36.00 | 0.977 | 6 | 7.683 | 7.773 | 8.181 |
| 3.40 | 0.748 | 2 | 4.272 | 4.972 | 4.457 | 37.00 | 0.978 | 6 | 7.710 | 7.831 | 8.191 |
| 3.60 | 0.760 | 2 | 4.368 | 5.168 | 4.501 | 38.00 | 0.979 | 6 | 7.740 | 7.895 | 8.202 |
| 3.80 | 0.771 | 2 | 4.465 | 5.365 | 4.546 | 39.00 | 0.980 | 6 | 7.767 | 7.953 | 8.213 |
| 4.00 | 0.781 | 2 | 4.562 | 5.562 | 4.591 | 40.00 | 0.981 | 6 | 7.797 | 8.016 | 8.224 |
| 5.00 | 0.820 | 3 | 4.824 | 5.050 | 5.256 | 41.00 | 0.982 | 6 | 7.824 | 8.074 | 8.234 |
| 6.00 | 0.847 | 3 | 5.062 | 5.541 | 5.361 | 42.00 | 0.983 | 6 | 7.853 | 8.136 | 8.245 |
| 7.00 | 0.867 | 3 | 5.303 | 6.036 | 5.471 | 43.00 | 0.983 | 6 | 7.882 | 8.198 | 8.256 |
| 8.00 | 0.883 | 3 | 5.547 | 6.531 | 5.584 | 44.00 | 0.984 | 6 | 7.911 | 8.260 | 8.267 |
| 9.00 | 0.895 | 4 | 5.700 | 5.791 | 6.204 | 45.00 | 0.985 | 6 | 7.940 | 8.321 | 8.278 |
| 10.00 | 0.905 | 4 | 5.818 | 6.037 | 6.254 | 46.00 | 0.986 | 6 | 7.968 | 8.381 | 8.289 |
| 11.00 | 0.913 | 4 | 5.937 | 6.284 | 6.305 | 47.00 | 0.987 | 6 | 7.997 | 8.441 | 8.300 |
| 12.00 | 0.920 | 4 | 6.056 | 6.530 | 6.359 | 48.00 | 0.988 | 6 | 8.026 | 8.503 | 8.312 |
| 13.00 | 0.926 | 4 | 6.177 | 6.777 | 6.413 | 49.00 | 0.989 | 6 | 8.055 | 8.565 | 8.323 |
| 14.00 | 0.931 | 4 | 6.297 | 7.023 | 6.468 | 50.00 | 0.989 | 6 | 8.084 | 8.625 | 8.335 |

An investigation of Table 6 reveals that, for $k \leq 5$ transitions of optimal values of k occur quite precisely at values of $\alpha_{\gamma,\alpha}$ that are powers of 2. This observation does not hold exactly in the transition firm k=5 to k=6, which occurs around $\alpha_{\gamma,\alpha}=33$. However, this is close enough, as high values of k do not occur frequently in practical images, and the penalty for over-estimation of k is very small at that point (specifically, 0.008 bits/symbol for using k=6 rather than k=5 at $\alpha_{\gamma,\alpha}=33$). The transition point from k=6 to k=7 is not shown, as the Golomb code starts expanding on the average at the higher end of the k=6 range. This is an extreme case of a deficiency of Golomb codes: since they can encode an infinite set of integers, they are incomplete whenever used for a finite alphabet, as they allocate coding space for values that are never encoded. This deficiency, which is most significant for small alphabets or large values of k, can be eliminated by truncating the unary part of the code for the last $2^k$ values (i.e., by not sending the "closing" 1, which is not needed after the maximum possible number of 0's has been sent). For $k=\beta 1$, this is equivalent to sending the prediction residual in plain β-bit binary representation.

More explicitly, it follows from Table 6 that equation 3a is a good estimate for the optimal value of k. This result holds also for other practical values of α.

13. Alphabet extension

Golomb codes, being a subset of the class of Huffman codes, suffer from high redundancy when encoding very low entropy distributions. Clearly, the code can never encode at less than 1 bit/symbol. To overcome this deficiency, in an alternative embodiment, the encoder 403 contains a run-length encoder 413.

Specifically, the encoder 403 enters a "run" mode when a context with a=b=c=d is detected. Because the central region of quantization for the gradients $g_1$, $g_2$, $g_3$ is the singleton {0}, the run condition is easily detected in the process of context quantization by checking for $[q_1,q_2,q_3]=[0,0,0]$. Once in run mode, a run of the symbol b is expected, and its length (which may be zero) is encoded. When the run is broken by a non-matching symbol x, the encoder goes into an "end-of-run" state, where the difference $\epsilon=x-b$ is encoded (notice that we always have $\epsilon \neq 0$ in this state). Runs can also be broken by ends of lines and by reaching a pre-specified maximum length, in which case the encoder returns to normal context-based coding. Since all the decisions for switching in and out of the run state are based on past pixels, the decoder can reproduce the same decisions without any side information.

The encoding of runs by the run-length encoder 413 is also based on Golomb codes. However, the distribution of run lengths varies significantly from image type to image type, and even from image to image within the same type. Thus, the run-length encoder 413 employs a mechanism by which run lengths are ranked by occurrence count. When a run of length r occurs, the rank of r is encoded rather than r itself (starting with rank 0 for the most frequent run length, and going up in rank number as frequency decreases). Because ranks are nonnegative numbers in a naturally decreasing distribution, they are good candidates for Golomb coding.

Because the ranking rapidly converges to a stable situation, the total number of ranking changes over the whole image is usually small. For the vast majority of runs encoded, all that is required is to increment a counter corresponding to the run length, and to check that the count does not surpass the count of the next run length up in the ranking, a condition which is almost always satisfied. Thus, the ranking mechanism does not have a significant impact on the speed or running time of the compressor. Moreover, using the ranking mechanism improves the bit rate, which ultimately results in reduced execution time. Also, notice that images where the run state is entered very frequently are usually compressed/decompressed much faster than the average.

Having the ranking mechanism at hand, we observe that the statistics of the "end-of-run" state in many images are far from the two-sided geometric characteristics expected by the Golomb coder (to start with, this state does not contain the zero symbol in its distribution). Thus, the run-length encoder 413 uses the ranking mechanism in this case as well, in lieu of the mapping $M(\epsilon)$ used in regular contexts. In this case also, the contribution of the ranking to the running time is negligible.

14. The method of operation of the image compressor of the present invention

The sequential steps image compressor 201 follows are described below. For simplicity, we omit special cases such as the treatment of the boundaries of the image. Thus, we assume that the surrounding pixel values a, b, c, d, and e are well-defined for the processed pixel $x_{i+1}$. For example, it can be assumed that all pixels outside the image boundaries are zero. We also assume 8-bit per pixel images (i.e., $\alpha$=256).

The procedure described below includes many parameters that have been arbitrarily selected for the purpose of this example. These parameters include the size of storage containers (e.g., one byte or two byte, and array sizes, etc.), initial values for the parameters A and N, initial rankings for run lengths, and reset thresholds. The values given herein are exemplary. In implementations of this procedure, and the corresponding decoding method (Section 15), these parameters may be adjusted to tune the compressor and decoder, respectively.

1)

a) For each context (a total of 1095) allocate four variables: N (context occurrence count), A (sum of magnitudes of prediction residuals in the context), B (sum of corrected prediction residuals after bias cancellation), and C (bias cancellation value). One byte is enough for N and C, while two bytes are used for A and B; a total of 6 bytes per context. The updating rules for these variables are specified later.

b) Initialize for each context A=4 and B=C=N=0.

c) Further allocate three arrays with 65 entries each. The first array will contain occurrence counts for the run lengths (0 to 64), stored in two bytes each and initialized to 0. The second and third arrays will contain the ranking mapping by run length frequencies and its inverse, respectively (one byte per entry). Similar accumulators A and N are assigned, with A initialized to 64 and N initialized to 1.

d) Initialize ranking mapping and its inverse. The initial ranking is such that run length 32 gets index 0, and then indices grow towards 0 and the maximal run length 64.

e) Allocate similar arrays with 255 entries for ranking in the "end-of-run" state (possible error values are −128, −127, . . . , −1, 1, 2, . . . , 127). Further initialize similar accumulators.

f) Initialize ranking mapping and its inverse. The initial ranking is −1,1,−2,2, . . . (error value 0 cannot occur in end-of-run state).

2)

a) Having processed the pixel sequence $x_1, x_2, \ldots, x_i$, start processing for the next pixel $x_{i+1}$. Given the values a, b, c, and d of the surrounding neighbors, compute the gradients $g_1$=d−a, $g_2$=a−c, and $g_3$=c−b.

b) Quantize the gradients $g_i$, 1, . . . , 3, as described in the Section 4. Context Determination and Pixel Encoding, to obtain quantized gradients $q_i$,i=1, . . . , 3. If the first non-zero component of the triplet $[q_1,q_2,q_3]$ is negative, change all the signs in the triplet and associate a negative sign to it. Otherwise, associate a positive sign. Quantization and sign determination is done through table look-up, thus obtaining a context number in the range [0,364] and a sign.

3) If $g_1=g_2=g_3=0$ (context number 0) and if not processing the last column, take the encoder into the "run" state (see separate routine).

Otherwise, continue in the "ordinary context" mode.

4)

a) Compute the gradient $g_4$=b−e and quantize it into three regions as described in Section 4. Context Determination and Pixel Encoding, to obtain $q_4$.

b) If the sign determined in 2b) is negative, change the sign of the quantized gradient $q_4$.

c) The Cartesian product of $[q_1,q_2,q_3]$ and $q_4$ yields a context number in the range [0,1094] and a sign.

5) Predict $x_{i+1}$ as $xpred_{i+1}$ according to equation (3).

6)

a) Increment the context occurrence count N.

b) Estimate the Golomb parameter k for the context through the following statement expressed in the C programming language:

```
for(k=0; (N<<k)<A; k++);
```

7)

a) Update bias correction value C and adjust accumulated corrected error B for the context. If k=0, proceed as in Table 4. Else, proceed as in Table 5.

b) Correct $xpred_{i+1}$: if the associated sign is positive, add C; otherwise, subtract C. Clip the value so that $xpred_{i+1}$ remains in the range [0,255].

8)

a) Compute prediction residual $\epsilon=x_{i+1}-xpred_{i+1}$.

b) If a negative sign is associated with the context, set $\epsilon$ to its negative (i.e., $\epsilon=-\epsilon$).

c) Reduce $\epsilon$ modulo 256, so that it belongs to the range [−128,127].

9) Remap $\epsilon$ to $M(\epsilon)$ as given by equation (4).

10)

a) Update: B and A as follows:

$$B=B+\epsilon$$

$$A=A+|\epsilon|$$

b) Check reset: if N=to a pre-specified reset threshold (e.g., 64), halve A, B, and N.

11) Golomb encode $M(\epsilon)$ as described in Section 10 Coding and return to Step 2.

Run state encoding routine

R1) While $x_{i+1}$=b, if not last column, and if the run-length count r<64, read $x_{i+2}$, increment i, and increment r.

R2) Find index i(r) corresponding to r in the rank mapping (entry associated with r in the corresponding array).

R3)

a) Increment occurrence count N for run state.

b) Estimate the Golomb parameter k for the run state through the following C language code:

```
for(k=0; (N<<k)<=A; k++);
if(k≠0) k—; \*(See note below)*\
```

R4)

a) Update A: A=A+i(r)

b) Check reset: if N=a pre-specified reset threshold for run state processing (e.g., 256), halve A and N.

R5) Golomb encode i(r) as described in Section 10 Coding.

R6) Keep ranked run-length frequencies:

a) increment the corresponding run-length count (first array).

b) Use the inverse rank and the counts to check whether a rank change occurred. If yes, make necessary switches in rank array and its inverse.

R7) If the exit from loop R1) was due to maximal run-length or end-of-line, return to Step 2. Otherwise, encode $[x_{i+1}-b]$ mod 256 (a non-zero integer between −128 and +127) in the end-of-run state. To this end, follow steps R2) through R5), but using arrays and accumulators corresponding to the end-of-run state. Update ranking and return to Step 2.

Note: The additional step of decrementing k in Step R3(b), as compared to Step 6(b) is due to the fact that in the run-state encoding A accumulates values (run lengths) that are only nonnegative and are one-sided geometrically distributed, whereas in the main encoding procedure A accumulates absolute values of quantities that are two-sided geometrically distributed and that can be nonnegative or negative.

This method of image compression may be carried out on a general purpose computer having, e.g., a central processor, a random access memory, a read-only memory, a number of input/output devices, a video memory. This computer may be connected to other computers via a network such as a local-area network (LAN), a wide-area network, or via a communications links such as telephone or cable-television networks. Alternatively, the method may be carried out on a special purpose device such as a medical imaging system. In either application the method may either be software instructions loaded into the systems memory and executed by the central processing unit, may be implemented using the hardware embodiments described above, or may be stored in a read-only memory as firmware.

15. Decoder

Figure 8:
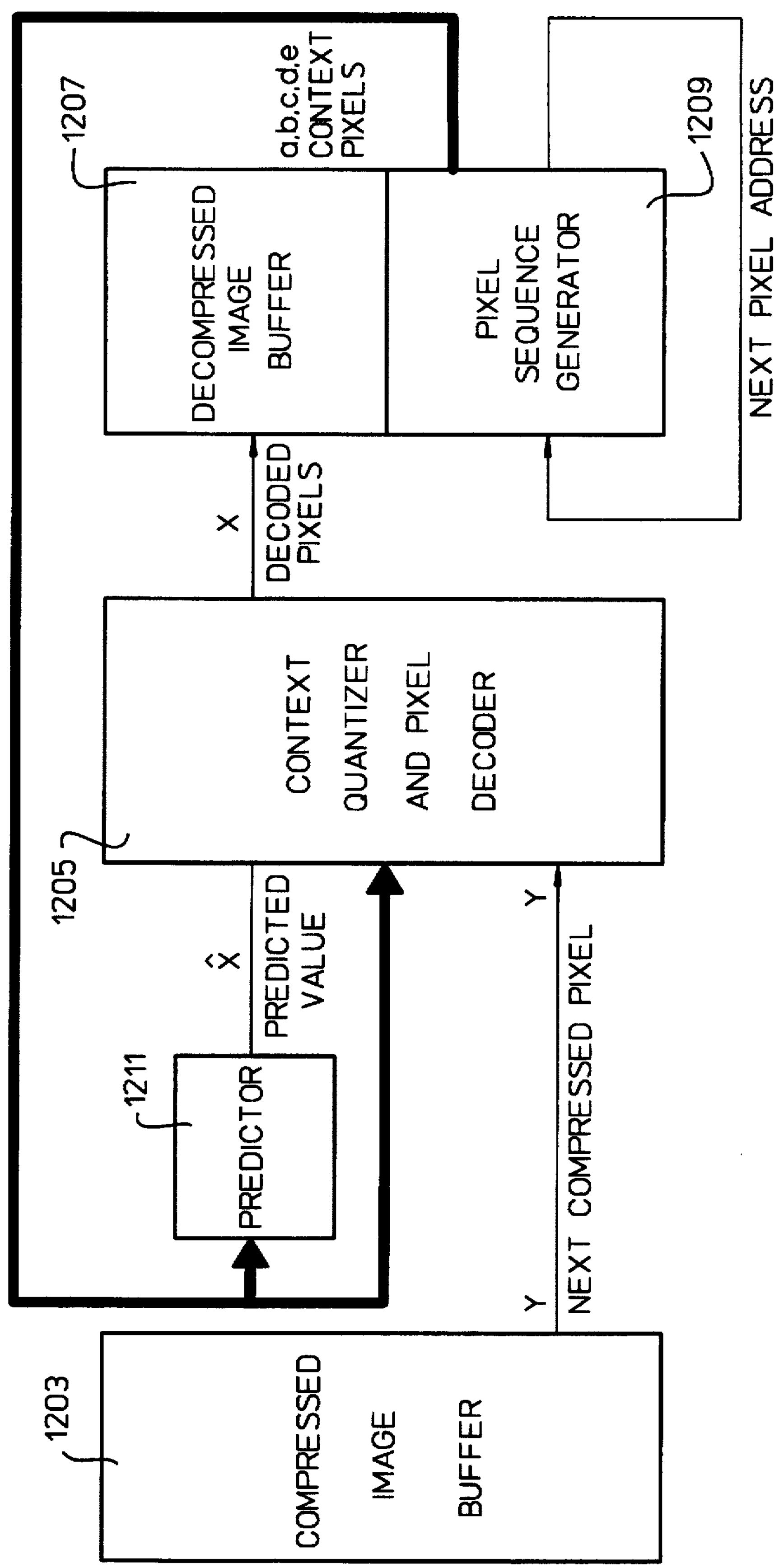
FIG. 8 is a block diagram of an image decoder according to the present invention and corresponding to the image compressor of FIG. 2.

FIG. 8 is a block diagram of an image decoder 1201 corresponding to the image compressor 201. The decoder 1201 accepts a compressed image from the image compressor 201 and stores this compressed image in a compressed-image buffer 1203.

The context quantizer 1205 determines the context of the pixel to be decoded in the same manner as the image compressor 201 determines the context for the pixel to be encoded. However, to obtain the context for the pixel, the image decompressor 1201 utilizes a previously decompressed sequence of pixels. Therefore, when a pixel has been decoded it is transmitted from the context quantizer and pixel decoder 1205 to a decompressed image buffer 1207. A pixel sequence generator 1209, connected to the decompressed image buffer, transmits the context pixels, a, b, c, d, and e (as defined above in conjunction with FIG. 3), to a predictor 1211. The predictor 1211 uses the same method as the predictor 207 of image compressor 201 to determine the predicted value, $\hat{x}_{i+1}$ which together with the context, a, b, c, d, and e, is fed into the context quantizer and pixel decoder 1205.

Figure 9:
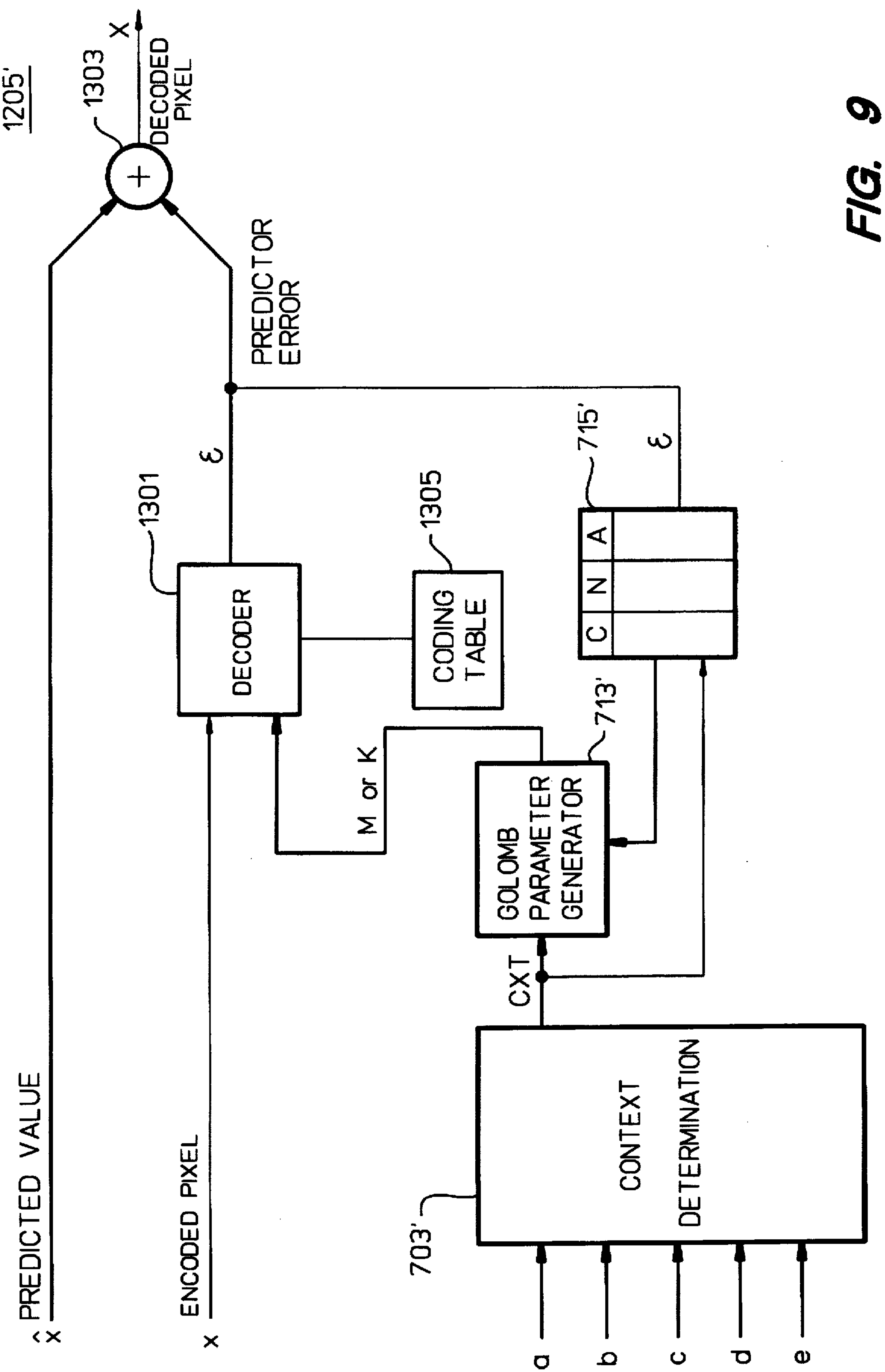
FIG. 9 is a block diagram of the context quantizer and pixel decoder of the image decoder of FIG. 8.
Figure 10:
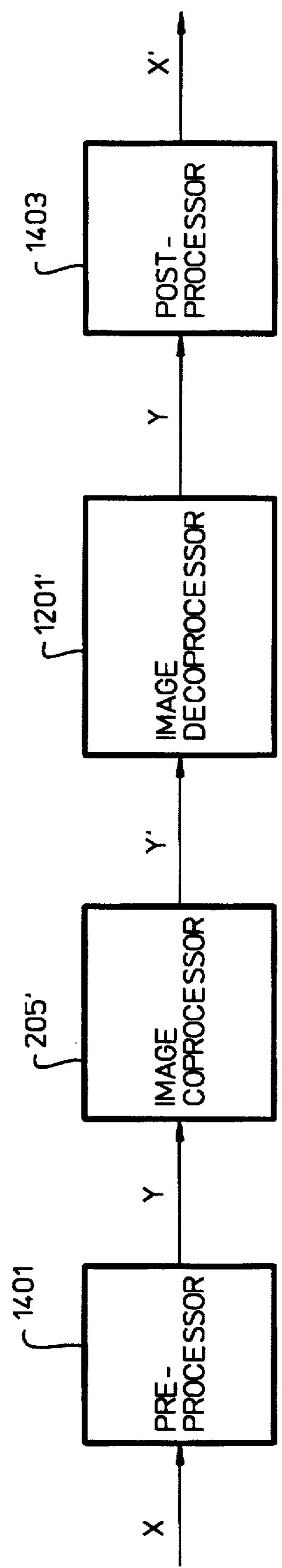
FIG. 10 is a block diagram showing the configuration of a near-lossless image compressor/decompressor system of the present invention.

FIG. 9 is a block diagram of the context quantizer and pixel decoder 1205. The unit 1205 receives the context values a, b, c, d, and e from the pixel sequence generator 1209. These context values are fed into the context determination unit 703' which operates like unit 703 (described above in conjunction with FIG. 4). The context determination unit 703' outputs a context index CXT. The context index is input into the Golomb parameter generator 713', which determines the Golomb parameters m or k according to the procedure described above in conjunction with Golomb parameter generator 713 of FIG. 4. As described above for the context quantizer and pixel encoder 209, the image decompressor 1205 a table 715' containing N and A values for each context CXT: N is a count of the number of occurrences of each context CXT and A is an accumulation of the magnitudes of the prediction errors encountered in the context CXT. During the decoding process, N and A are updated after each pixel has been decoded.

The Golomb parameters m or k are input to the decoder 1301. The decoder 1301 also receives the encoded pixel x. Using the Golomb parameter m or k and the encoded pixel value x, the decoder 1301 looks up error value e corresponding to the parameter and pixel value in a code table 1305. The code table 1305 is inverse of the code table 3, corresponding to the codes generated by the encoder 403. The main difference in the two is that the code table 1305 is optimally organized to efficiently look up the prediction residual $\epsilon$ from the code and the Golomb parameter.

The context quantizer 703' of unit 1205' operates according to the same method as the context quantizer 703 of the image compressor system 201. Thus, the context quantizer 703' determines the quantized context $CXT=[q_1,q_2,q_3,q_4]$ according to Tables 1 and 2. Having looked up the error value $\epsilon$, an adder 1303 of the pixel decoder 1205 adds the error value $\epsilon$ to the predicted value $\hat{x}_{i+1}$ to compute the decoded pixel value x.

16. Decoding method

Decoding proceeds in a similar fashion to that of the encoding method described above.

Method

1)

a) For each context (a total of 1095) allocate four variables: N (context occurrence count), A (sum of magnitudes of prediction residuals in the context), B (sum of corrected prediction residuals after bias cancellation), and C (bias cancellation value). One byte is enough for N and C, while two bytes are used for A and B; a total of 6 bytes per context. The updating rules for these variables are specified later.

b) Initialize for each context A=4 and B=C=N=0.

c) Further allocate three arrays with 65 entries each. The first array will contain occurrence counts for the run lengths (0 to 64), stored in two bytes each and initialized to 0. The second and third arrays will contain the ranking mapping by run length frequencies and its inverse, respectively (one byte per entry). Similar accumulators A and N are assigned, with A initialized to 64 and N initialized to 1.

d) Initialize ranking mapping and its inverse. The initial ranking is such that run length 32 gets index 0, and then indices grow towards 0 and the maximal run length 64.

e) Allocate similar arrays with 255 entries for ranking in the "end-of-run" state (possible error values are −128, −127, . . . , −1, 1, 2, . . . , 127). Further initialize similar accumulators.

f) Initialize ranking mapping and its inverse. The initial ranking is −1,1,−2,2, . . . (error value 0 cannot occur in end-of-run state).

2)

a) Having decoded the pixel sequence $x_1, x_2, \ldots, x_i$, start decoding the next pixel $x_{i+1}$. Given the values a, b, c, and d of the surrounding decoded neighbors, compute the gradients $g_1=d-a$, $g_2=a-c$, and $g_3=c-b$.

b) Quantize the gradients $g_i$, i=1, . . . 3, as described in Section 4, to obtain quantized gradients $q_i$, i=1, . . . , 3. If the first non-zero component of the triplet $[q_1, q_2, q_3]$ is negative, change all the signs in the triplet and associate a negative sign to it. Otherwise, associate a positive sign. Quantization and sign determination is done through table look-up, thus obtaining a context number in the range [0,364] and a sign.

3) If $g_1=g_2=g_3=0$ (context number 0) and if not processing the last column, take the decoder into the "run" state (see separate routine). Otherwise, continue in the "ordinary context" mode.

4)

a) Compute the gradient $g_4=b-e$ and quantize it into three regions as described in Section 4, to obtain $q_4$.

b) If the sign determined in 2b) is negative, change the sign of the quantized gradient $q_4$.

c) The Cartesian product of $[q_1, q_2, q_3]$ and $q_4$ yields a context number in the range [0,1094] and a sign.

5) Predict $x_{i+1}$ as $xpred_{i+1}$ according to equation (3).

6)

a) Increment the context occurrence count N.

b) Estimate the Golomb parameter k for the context using the following C language statement:

```
for(k=0; (N<<k)<A; k++);
```

7)

a) Update bias correction value C and adjust accumulated corrected error B for the context. If k=0, proceed as in Table 4. Else, proceed as in Table 5.

b) Correct $xpred_{i+1}$: if the associated sign is positive, add C; otherwise, subtract C. Clip the value so that $xpred_{i+1}$ remains in the range [0,255].

8)

a) Decode the value of $M(\epsilon)$ corresponding to the next Golomb code.

b) Reverse the mapping $M(\epsilon)$ as given by equation (4) to recover $\epsilon$.

9) If a negative sign is associated with the context,.

compute the pixel value as $x_{i+1}=(xpred_{i+1}-\epsilon)$ modulo 256, otherwise, compute the pixel value as $x_{i+1}=(xpred_{i+1}+\epsilon)$ modulo 256.

10)

a) Update:

$B=B+\epsilon$ $A=A+|\epsilon|$ b) Check reset: if N=is a prespecified threshold, e.g., 64, halve A, B, and N.

11) Return to Step 2.

Run state decoding routine

R1)

a) Increment occurrence count N for run state.

b) Estimate the Golomb parameter k for the run state through:

```
for(k=0; (N<<k)<=A; k++);

if(k)k—;
```

R2) Read and decode the Golomb code for i(r). Find the value for r in the inverse rank mapping.

R3)

a) Update: A=A+i(r)

b) Check reset: if N=a prespecified threshold, e.g., 256, halve A and N.

R4) Output r pixels having the value b.

R5) Keep ranked run-length frequencies:

a) increment the corresponding run-length count (first array).

b) Use the inverse rank and the counts to check whether a rank change occurred. If yes, make necessary switches in rank array and its inverse.

R6) If r is the maximal run-length or arrived at end-of-line, return to Step 2. Otherwise, decode next entry in the end-of-run state. To this end, follow steps R1) through R3), but using arrays and accumulators corresponding to the end-of-run state. The decoded value is $x_{i+1}=(b+r)$ mod 256. Update ranking and return to Step 2.

17. Experimental Results

Appendix A shows a comparison in compression performance between LOCO-I, CALIC-Huffman (Wu, et al. ibid), and the simplest Huffman version of the current lossless JPEG standard, JPEG-H, (i.e., the default predictor followed by Huffman encoding with default table), for a standard set of images provided by the standardization committee of ISO/IEC. For each scheme, and each image in the standard set, Appendix A includes the total number of compressed bits produced by the scheme, and the bit rate in bits per symbol (JPEG-H was run only on 8-bit per pixel images). In addition, for CALIC-H and JPEG-H, we list (in the column labeled "Diff") the size difference between the compressed file produced by the scheme, and the one produced by LOCO-I. This difference is expressed as a percentage of the compressed file size produced by LOCO-I. Positive percentages indicate an advantage for LOCO-I, while negative percentages indicate an advantage for the scheme being compared.

In addition, Appendix A includes compression results summarized by image group, for LOCO-I and CALIC-H. The bit rates presented are the average of the bit rates for all the images of the group, irrespective of file size and original symbol sizes. The results show an advantage for LOCO-I in all groups except "aerial," where CALIC-H has an advantage of less than 0.5%.

18. Alternative embodiments

There are many possible variations of the present invention, some of which are mentioned in this section. Some of these depend on specific target applications and on that application's particular complexity/compression constraints.

One alternative embodiment, which may be preferable in applications where reducing memory requirements is a critical design objective, has only one context corresponding to all the "regular" contexts described in Section 4. The A and N values, the computation of the Golomb parameter from these values, and the bias cancellation are then carried out over that one universal context. In this one-context-embodiment, the context determination is avoided. A variation of this one-context-embodiment also includes contexts for an alphabet-extension, e.g., contexts for run-length encoding and end-of-run state.

In some cases, the edge detecting capabilities should be adapted to the specific complexity constraints. For example, predictors that use knowledge of the NE pixel value provide better edge detection. However, the crucial modeling step is performed by the context modeler, and the impact of better predictors may be limited and not merit the additional complexity.

Additionally, the system and method of the present invention, as described above in conjunction with FIGS. 2–11, is adaptable to the compression of color images. How the present invention is used in conjunction with color images depends on the color space in which the image is represented. The YUV-type of representation is generally assumed to produce fairly uncorrelated images, which, consequently, can be independently compressed as gray-scale images. On the other hand, the RGB representation in some cases presents a strong correlation between its components. Hence, although the image compression method of the present invention may be applied to separate planes, in other RGB-alternatives the prediction and modeling templates account for inter-plane correlation. In one embodiment the Green plane (which contains most of the luminance information) is compressed as a gray-scale image, and then using its pixel values to model the other two planes.

Predictors for the Red and Blue planes, based on both intra-plane correlation and correlation with the Green plane, used by a compressor for color images according to the present invention, to be followed by the method of the gray-scale version of the image compressor 201 predicts the Blue and Red planes by $$\bar{x}_{i+1}=\frac{a+b}{2}+x_{i+1}^{(G)}-\frac{a^{(G)}+b^{(G)}}{2} \tag{12}$$

where the superscript (G) denotes the corresponding value in the Green plane. Thus, a predictor operating according to (12) can be interpreted as correcting the value that would be picked by the predictor number 7 of JPEG, with the error made by this predictor in the Green plane.

The system and method of the present invention is further adaptable to conform to near-lossless compression as defined by the ISO/IEC/SC29/WG1 committee. The near-lossless standard requires that there is a uniform bound E (e.g. 1, 2, 3, 7) on the difference between each original pixel and its decoded version.

Figure 11:
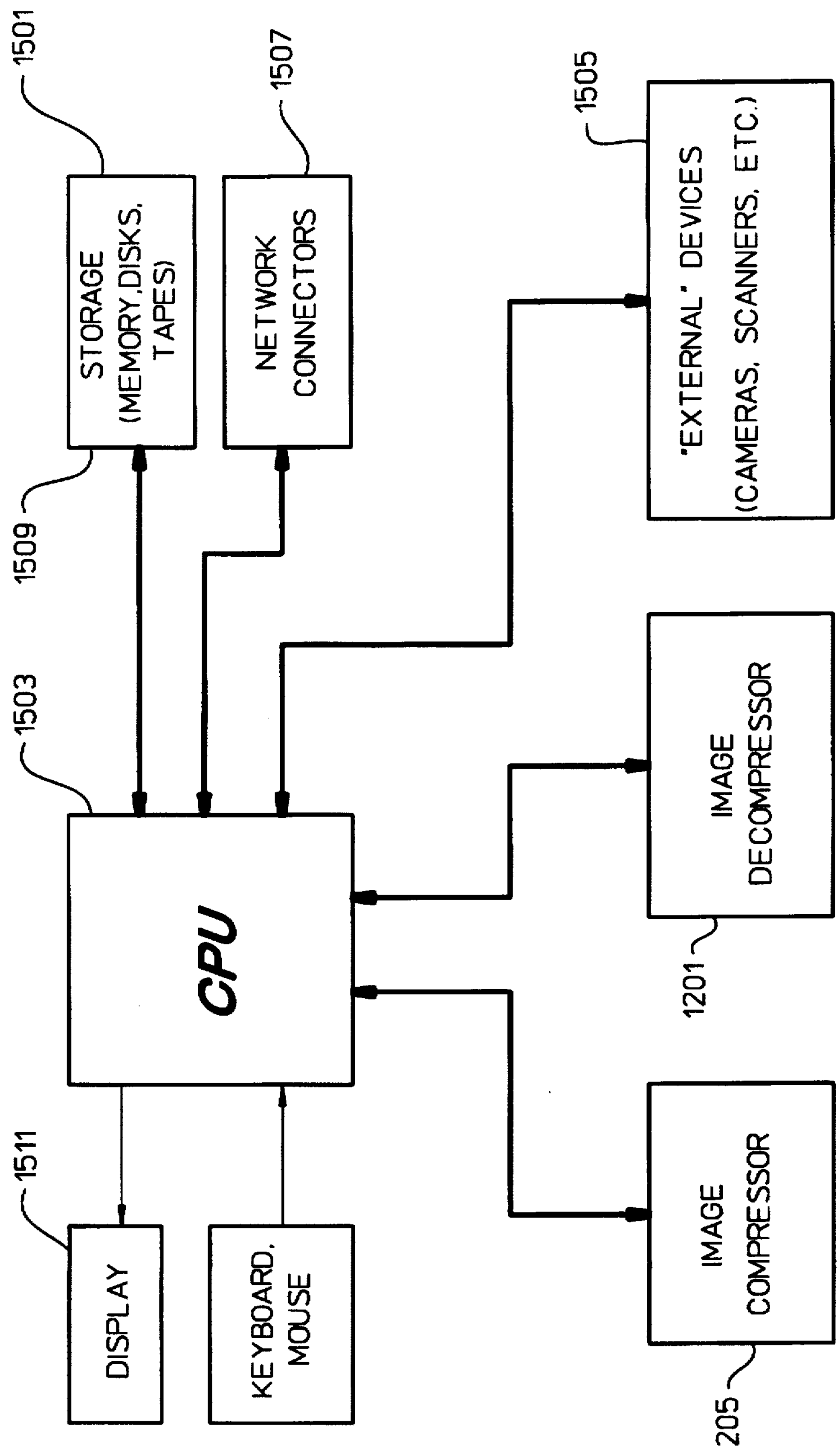
FIG. 11 is a block diagram of a computer system having an image compressor and an image decompressor according to the present invention.

FIG. 11 is a block diagram showing the configuration of an image compressor/decompressor system having a pre-processor 1401 prior to an image compressor 205'. The image compressor 205' is of the same design and operates like the image compressor 205. The pre-processor introduces the allowed error. Thus, the error is transparent to the image compressor 205', which operates in a lossless scheme.

The pre-processor 1401 is a scalar quantization that maps each pixel value into one of approximately A/(2E+1) values, thus reducing the size of the input alphabet A. More specifically, according to one embodiment each pixel value in the original image is mapped into $$y_i=\left\lfloor\frac{x_i}{2E+1}\right\rfloor. \tag{13}$$

Subsequent to the mapping of all pixels, $x_i$, in the image to corresponding values $y_i$ the image compressor 205' compresses the image y according to the procedure described for image compressor 205 into compressed image y'.

The corresponding decompressor 1201' is of similar design and operates according to the same method as image decompressor 1201, described above in conjunction with FIG. 12. The decompressor 1201' losslessly decompresses y' into image y according to the procedure described above for image decompressor 1201.

The image decompressor 1201' is followed by a post-processor 1403. The post-processor 1303 is a scalar dequantizer and performs a reconstruction mapping according to $$x'=y(2E+1)+E \tag{14}$$

The absolute value |x−x'| of the reconstruction error is upper-bounded by E, because x' is the positive integer closest to x and congruent to E mod (2E+1). With (14) large values of y might be mapped to values x' greater than A−1, in which case x' is truncated to A−1.

In another near-lossless embodiment of the present invention, the pre-processor 1401 maps each pixel value $x_i$ into $$y_i=\left\lfloor\frac{x_i}{2E+1}\right\rceil. \tag{13}$$

In this alternative, the corresponding reconstruction mapping performed by the post-processor 1403 according to $$x'_i=y_i(2E+1). \tag{16}$$

In this embodiment, $x'_i$ is the positive integer closest to x and congruent to 0 mod (2E+1). In the event of an "overflow" the post-processor 1403 truncates excessive values to A-1.

FIG. 11 is a block diagram of a computer system 1501 incorporating the image compressor 205 and image decompressor 1201. The computer system 1501 has a central processing unit 1503 connected to one or more image sources 1505. The image sources 1505 may include devices such as digital cameras and scanners. The computer system 1501 may also be connected to computer networks, such as local area networks, the Internet, or online services, via network connections 1507 (e.g., via direct connections to networks or via modem). The CPU 1503 transmits images from the image sources 1505 to the image compressor 205 which compresses the image according to the method described above.

The CPU 1503 is further connected to storage devices 1509, e.g., memories (both for storage of images and other data), disk drives, and tape units. Subsequent to the compression of the images, the CPU 1503 may transmit images to these storage devices 1509. Alternatively, the CPU 1503 may direct the images to the network connections 1507.

The computer system 1501 may also decompress compressed images for display. The CPU may, for example, obtain a compressed image via the network connection 1507. The CPU 1503 directs such compressed images to the image decompressor 1201 which decompresses the image according to the method described above for image decompression. The CPU 1503 is further connected to a display 1511, e.g., a cathode-ray tube or flat-panel display. The CPU 1503 directs decompressed images for display on the display 1511.

In one embodiment, the image compressor 205 and the image decompressor 1201 is implemented as computer instructions operable to direct the operations of the CPU 1503. In such a case the image compressor 205 and image decompressor 1201 are stored in one of the storage devices 1509 and are executed by the CPU 1503 to compress and decompress images according to the methods of the present invention.

In an alternative embodiment the image processor 205 and image decompresor 1201 are special purpose hardware devices, e.g., image processing accelerators, attached to the CPU 1503 as auxiliary devices.

In certain applications, a computer system 1501 may need only be able to decompress images and not to compress images, and vice versa. In such cases either the compressor 205 or decompressor 1201 may be absent from the computer system 1501.

Although specific embodiments of the invention have been described and illustrated, the invention is not to be limited to the specific forms or arrangement of parts so described and illustrated. For example, the description herein gives specific values for initial values of certain parameters and threshold values. These are provided for purposes of illustration and should not be construed in a limiting fashion. The invention is only limited by the claims.

for each pixel in the image:

determining in which context the pixel occurs;

incrementing the counter N for the context;

predicting the value of the pixel;

determining a prediction residual, $\epsilon$, for the pixel by subtracting the predicted value from the pixel value;

mapping the prediction residual $\epsilon$ to a non-negative value $M(\epsilon)$ determining a parameter k as a function of the values A and N;

adding the magnitude of the prediction residual to the accumulator A for the context;

encoding the mapped value $M(\epsilon)$ in a first portion and in a second portion, the first portion being a binary representation of $M(\epsilon)$ mod m and the second portion being a unary representation of $\lfloor M(\epsilon)/m \rfloor$, where $m=2^k$.

APPENDIX A

Lossless Compression Comparison

| | In | | | LOCO-I | | CALIC-H | | | JPEG-H | | |
|---|---|---|---|---|---|---|---|---|---|---|---|
| Image | bps | Type | Samples | bits | bps | bits | bps | Diff | bits | bps | Diff |
| aerial2 | 8 | aerial | 2211840 | 8863424 | 4.007 | 8744885 | 3.954 | −1.34% | 11345520 | 5.129 | 28.00% |
| band | 8 | aerial | 2166784 | 7292312 | 3.366 | 7437088 | 3.432 | 1.99% | 9418336 | 4.347 | 29.15% |
| aerial1 | 11 | aerial | 3145728 | 26740432 | 8.501 | 26466476 | 8.413 | −1.02% | | | |
| chart | 8 | compound | 12483000 | 16559888 | 1.327 | 17702721 | 1.418 | 6.90% | 30110344 | 2.412 | 81.83% |
| chart_s | 8 | compound | 11885208 | 32606152 | 2.743 | 34093628 | 2.869 | 4.56% | 48206880 | 4.056 | 47.85% |
| cmpnd1 | 8 | compound | 1179648 | 1536416 | 1.302 | 1615929 | 1.370 | 5.18% | 3245200 | 2.751 | 111.22% |
| cmpnd2 | 8 | compound | 4300800 | 5789768 | 1.346 | 5776127 | 1.343 | −0.24% | 11640456 | 2.707 | 101.05% |
| faxballs | 8 | computer | 1572864 | 1533000 | 0.975 | 1708782 | 1.086 | 11.47% | 2723224 | 1.731 | 77.64% |
| pc | 8 | computer | 10324125 | 14913008 | 1.444 | 14537160 | 1.408 | −2.52% | 29306392 | 2.839 | 96.52% |
| finger | 8 | medical | 262144 | 1475080 | 5.627 | 1468308 | 5.601 | −0.46% | 1559312 | 5.948 | 5.71% |
| us | 8 | medical | 229376 | 611424 | 2.666 | 634594 | 2.767 | 3.79% | 864712 | 3.770 | 41.43% |
| cr | 10 | medical | 3571712 | 18831312 | 5.272 | 19835799 | 5.554 | 5.33% | | | |
| mri | 11 | medical | 65536 | 396128 | 6.044 | 445857 | 6.803 | 12.55% | | | |
| ct | 12 | medical | 262144 | 1005912 | 3.837 | 1348354 | 5.144 | 34.04% | | | |
| x_ray | 12 | medical | 3440640 | 20537984 | 5.969 | 24014034 | 6.980 | 16.92% | | | |
| bike3 | 8 | scanned | 2153217 | 9415888 | 4.373 | 9517903 | 4.420 | 1.08% | 11149224 | 5.178 | 18.41% |
| cats | 8 | scanned | 18874368 | 48815368 | 2.586 | 48664913 | 2.578 | −0.31% | 70427056 | 3.731 | 44.27% |
| educ | 8 | scanned | 11673600 | 52125000 | 4.465 | 52601592 | 4.506 | 0.91% | 63101456 | 5.405 | 21.06% |
| ingres8 | 8 | scanned | 56512512 | 177492896 | 3.141 | 186227656 | 3.295 | 4.92% | 222425216 | 3.936 | 25.31% |
| water | 8 | scanned | 18874368 | 33849152 | 1.793 | 34400870 | 1.823 | 1.63% | 49631000 | 2.630 | 46.62% |
| ingres16 | 12 | scanned | 56512512 | 395250952 | 6.994 | 401498457 | 7.105 | 1.58% | | | |
| bike | 8 | scid | 20971520 | 75307032 | 3.591 | 75443341 | 3.597 | 0.18% | 90935096 | 4.336 | 20.75% |
| cafe | 8 | scid | 20971520 | 100601448 | 4.797 | 100205130 | 4.778 | −0.39% | 120299896 | 5.736 | 19.58% |
| tools | 8 | scid | 7315200 | 37065760 | 5.067 | 37485714 | 5.124 | 1.13% | 41789680 | 5.713 | 12.74% |
| woman | 8 | scid | 20971520 | 87566144 | 4.175 | 86994380 | 4.148 | −0.65% | 101826032 | 4.855 | 16.28% |
| gold | 8 | video | 829440 | 3248408 | 3.916 | 3260772 | 3.931 | 0.38% | 3591416 | 4.330 | 10.56% |
| hotel | 8 | video | 829440 | 3138792 | 3.784 | 3180241 | 3.834 | 1.32% | 3637048 | 4.385 | 15.87% |

Summarized by image group:

| | LOCO-I | | CALIC-H | | |
|---|---|---|---|---|---|
| Image set | bits | bps | bits | bps | Diff |
| aerial | 42896168 | 5.291 | 42648449 | 5.266 | −0.47% |
| compound | 56492224 | 1.680 | 59188405 | 1.750 | 4.18% |
| computer | 16446008 | 1.210 | 16245942 | 1.247 | 3.11% |
| medical | 42857840 | 4.903 | 47746946 | 5.475 | 11.67% |
| scanned | 716949256 | 3.892 | 732911391 | 3.955 | 1.60% |
| scid | 300540384 | 4.408 | 300128565 | 4.412 | 0.10% |
| video | 6387200 | 3.850 | 6441013 | 3.883 | 0.84% |

We claim:

1. A method for compressing a digitized image composed of an array of pixels each having a value, the method including a method of determining a Golomb-power-of-two code, comprising:

initializing an array of counters, N, each counter for counting the number of pixels in each of at least one context;

initializing an array of accumulators, A, each accumulator for accumulating a sum of magnitudes of prediction residuals encountered in each of at least one context;

2. The method of claim 1, wherein:

if $\epsilon$ is less than zero (0), $M(\epsilon)=2|\epsilon|-1$, and if $\epsilon$ is greater than or equal to zero (0), $M(\epsilon)=2|\epsilon|$.

3. The method of claim 1, wherein k is determined from the following relationship:

$$k=\left\lfloor \log_2\left(\frac{A}{N}\right)\right\rfloor \quad (5)$$

4. The method of claim 1, wherein k is determined using instructions equivalent to the C language statement:

```
for (k=0; (N<<k)<A; k++).
```

5. The method of claim 1, wherein k is determined by:

a. storing N in a shift register;

b. left-shifting the shift register until the shifted value is greater than or equal to the value of A; and c. setting k to the number of left-shifts from step 5.b.

6. The method of claim 1, wherein each pixel value is a member of a first alphabet of values, further comprising the step of:

mapping each pixel value of said image to a value in a second alphabet, wherein said second alphabet is a subset of said first alphabet.

7. The method of claim 6, wherein after decoding said mapping introduces an error of uniform bound E and each pixel value $x_i$ is mapped to a value $y_i$ according to the relationship:

$$y_i=\left\lfloor \frac{x_i}{2E+1}\right\rfloor. \quad (13)$$

8. A method for operating a computer to compress a digitized image composed of an array of pixels each having a value, the method including a method of determining a Golomb code, comprising:

initializing an array of counters, N, each counter for counting number of pixels in each of at least one context;

initializing an array of accumulators, A, each accumulator for accumulating a sum of magnitudes of prediction residuals encountered in each of at least one context;

for each pixel in the image:

determining in which context the pixel occurs;

incrementing the counter N for the context;

predicting the value of the pixel;

determining a prediction residual, $\epsilon$, for the pixel by subtracting the predicted value from the pixel value;

mapping the prediction residual $\epsilon$ to a non-negative value $M(\epsilon)$;

determining a parameter m as a function of values A' and N'; where $A'=A^q$ and $N'=N^q$ and wherein q is a positive integer;

adding the magnitude of the prediction residual $\epsilon$ to the accumulator A for the context;

encoding the mapped prediction residual $M(\epsilon)$ in a first portion and in a second portion, the first portion being a binary representation of $M(\epsilon)$ mod m and the second portion being a unary representation of $\lfloor M(\epsilon)/m \rfloor$.

9. The method of claim 8 wherein q=2 and the step of determining the parameter m comprises the steps of operating the computer to:

computing a quantity k' by executing instructions equivalent to the C language statement:

```
for (k'=0; (N'<<k')<A', k'++); and
```

computing setting the value m to an integer value close to $$(\sqrt{2})^{k'}$$

10. A method of operating a computer to losslessly compress digitized images comprising the steps of:

a. retrieving an image to compress from an input device;

b. for each pixel in the image:

i. directing the computer to determine a context for the pixel;

ii. directing the computer to use the context of a pixel in the image to determine a predicted value for the pixel;

iii. comparing the predicted value and the actual value, thereby producing a residual value $\epsilon$, iv. mapping the residual value $\epsilon$ to a mapped value $M(\epsilon)$;

v. computing a Golomb corresponding to the residual from a context-specific value N and a context-specific value A, where N is a count of pixels encountered in the context, and A is an accumulation of magnitudes of prediction residuals for pixels in the context; and c. transmitting the code to a decoder.

11. The method of claim 10 further comprising the step of computing the context by determining values of gradients between pixels adjacent to the pixel.

12. The method of claim 11 further comprising the step of computing the context by quantizing the gradients into approximately equiprobable regions.

13. The method of claim 10, wherein the mapping $M(\epsilon)$ is an alphabet of encodable events, the method further comprising the step of:

defining a first special context; and when processing a pixel that occurs in the first special context, encoding using a Golomb code an event that is an extension of the alphabet of encodable events.

14. The method of claim 13 wherein the alphabet extension is a length of consecutive constant values.

15. The method of claim 23 wherein the constant values are constant pixel values.

16. The method of claim 23 wherein the constant values are constant prediction residuals.

17. The method of claim 14 farther comprising the step of ranking the lengths of consecutive constant prediction residuals by occurrence counts; and for an occurrence of a length r of consecutive constant prediction residuals, encoding the length as a Golomb code for the rank of the length, i(r).

18. The method of claim 17 wherein the step of encoding the rank of the length i(r) as a Golomb code, further comprises the steps of:

determining a Golomb parameter k by executing instructions equivalent to the C statements:

```
for (k=0; (N<<k)<=A;k++);

if (k≠0)k--;
```

encoding the rank of the length i(r) as a first portion and as a second portion, said first portion being a binary representation of i(r) mod m and the second portion being a unary representation of $\lfloor i(r)/m \rfloor$, where $m=2^k$.

19. The method of claim 14 further comprising the steps of:

defininig a second special context;

when encoding a pixel immediately following the encoding of an event in the first special context:

encoding the pixel immediately following the encoding of an event in the first special context using a Golomb parameter obtained from values A and N for the second special context; and updating the values A and N for the second special context.

20. The method of claim 19 wherein the constant values are constant pixel values; and a pixel occurring in the second special context is the first pixel following a run of constant pixel values.

21. The method of claim 17 wherein the context is computed from values of pixels previously encoded and adjacent to the pixel being processed, and wherein a pixel occurs in said special context when gradients between pairs of the adjacent pixels are all zero (0).

22. The method of claim 10, wherein the prediction residuals in an image have a distribution, and further comprising the step of:

cancelling biases in the distribution of prediction residuals in images being compressed by adjusting the distribution of prediction residuals to a distribution matched to Golomb encoding and the mapping $M(\epsilon)$.

23. The method of claim 22 wherein biases in prediction are cancelled, further comprising the steps of:

for each context centering the distribution of prediction residuals occurring in that context by:

for each context, computing a correction value C as a function of an accumulation of prediction residuals B encountered in the context and a count N of occurences of the context; and for each pixel, prior to encoding the pixel, correcting the predicted value of the pixel by adding the correction value C to the predicted value for the pixel.

24. The method of claim 23 wherein:

the accumulation of prediction residuals B is the accumulation of prediction residuals prior to correction of the predicted value; and the correction value C is computed by dividing B by N.

25. The method of claim 23 further comprising the step of:

adjusting the value C as a function of the values B and N.

26. The method of claim 10 further comprising the step of:

if the value N for a particular context exceeds a predetermined threshold value $N_0$, resetting the values for N and A.

27. The method of claim 26 wherein N and A are reset to half their values prior to being reset, respectively.

28. The method of claim 23 wherein:

the accumulation of prediction residuals B is the accumulation of prediction residuals after correction of the predicted value; and further comprising the step of computing C and B by:

if B is a large negative number, decrementing C and adding N to B; and if B is a large positive number, incrementing C and subtracting N from B.

29. The method of claim 28, wherein the large negative number is a number less than or equal to the negative of N divided by 2, and wherein the large positive number is a number greater than N divided by 2.

30. The method of claim 23 further comprising the steps of:

if B is less than or equal to the negative of N, decrementing C and adding N to B; and if B is greater than 0, incrementing C and subtracting N from B.

31. The method of claim 11 the step of quantizing the context further comprises the step of:

quantizing each gradient into one of a small number of regions defined by at least one integer valued threshold parameter.

32. The method of claim 31 wherein the context of a pixel being encoded is determined from a causal template of neighboring pixels, including a first pixel immediately north of the pixel being encoded, a second pixel west of the pixel being encoded, a third pixel northwest of the pixel being encoded, and a fourth pixel northeast of the pixel being encoded, each having a value, and the step of determining the context further comprises the steps of:

determining a first gradient between the values of the fourth and the first pixels;

determining a second gradient between the values of the first and the third pixels; and determining a third gradient between the values of the third and the second pixels.

33. The method of claim 32 wherein the causal template further includes a fifth pixel immediately west of said second pixel, and the step of determining the context further comprises the step of:

determining a fourth gradient between the values of the second and fifth pixels.

34. An image compression encoder system wherein for each pixel in an image there is a context based on the pixels that have been encoded prior to the each pixel, having an encoder comprising:

a. an image buffer containing a portion of at least one digitized image;

b. a pixel generator connected to the image buffer and operable to determine the value of a pixel in the image buffer and the context of the pixel;

c. a predictor for predicting the value of the pixel;

d. a comparator connected to the pixel generator to obtain the value of the pixel and connected to the predictor to obtain the predicted value, and operable to compute a prediction residual for the pixel;

e. a context quantizer operable to compute a quantized context for the pixel;

f. a storage unit connected to the context quantizer and operable to store a count N of occurrences of each quantized context and an accumulation of magnitudes of prediction residuals A for pixels in each context;

g. a Golomb code parameter generator connected to the storage unit and the context quantizer and operable to compute a Golomb parameter m as a function of the value N and the value A for the context of the pixel; and h. a code generator connected to the comparator and the Golomb code parameter generator and operable to produce a Golomb code for the pixel based on the Golomb parameter m and the predicted value.

35. The image compression encoder system of claim 34 wherein the Golomb code parameter generator generates the Golomb parameter m using instructions equivalent to a C language statement comprising:

```
for (k=0; (N<<k)<A; k++); and
```

wherein $m=2^k$.

36. The image compression encoder system of claim 35 wherein the Golomb code parameter generator for a special context generates the Golomb parameter m using instructions equivalent to the C language statements comprising:

```
for (k=0; (N<<k)<A; k++);

if (k≠0) k--; and
```

wherein $m=2^k$.

37. The image compression encoder system of claim 34 wherein the Golomb code parameter generator further comprises:

a circuit for generating the Golomb parameter m, the operation of the circuit being defined by the C language statements:

```
for (k=0; (N<<k)<A; k++); and
```

wherein $m=2^k$.

38. The image compression encoder system of claim 34 wherein the Golomb code parameter generator further comprises:

a first comparator having an output $k_0$ and operable to compare the length of N to the length of A, and if the length of A is greater than the length of N, setting the output $k_0$ to the difference in the length of A and the length of N, otherwise the output $k_0$ to zero (0);

a shift register for storing the value N connected to $k_0$ and operable to left shift N $k_0$ times, thereby outputting a quantity $N<<k_0$;

a second comparator connected to the quantity $N<<k_0$ and to A, and operable to output a one (1) if $N<<k_0$ is less than A, otherwise to output a zero (0); and an adder connected to the quantity $k_0$ and to the output of the second comparator, and operable output the quantity k equal to the sum of $k_0$ and the output of the second comparator.

39. The image compression encoder system of claim 34 wherein the Golomb code parameter generator generates the Golomb parameter m using instructions equivalent to a C language statement comprising:

```
for (k'=0; (N'<<k')<A'; k'++);
```

wherein $m=(2^{1/q})^{k'}$, $N'=N^q$, $A'=A^q$, and q is a positive integer.

40. The image compression encoder system of claim 34, further having bias cancellation circuitry comprising:

a first storage unit for maintaining an occurence count N for each context;

a second storage unit for maintaining an accumulation of prediction residuals B for each context;

a third storage unit for maintaining a correction value C for each context;

a first multiplexer connected to the third storage unit for selectively causing the value C for each context to be incremented, decremented or left unchanged;

an adder connected to a predicted value for the pixel to be encoded and to the third storage unit and operable to cause the value C for the context of the pixel to be added to the predicted value for the pixel, thereby producing a corrected predicted value;

a subtractor connected to the pixel value and to the corrected predicted value to produce a prediction residual; and a control circuit connected to accept the value B and the value N as inputs and to connected to the first multiplexer to select whether the value C for each context to be incremented, decremented or left unchanged based on the value B and the value N for the context.

41. The image compression encoder system of claim 40 further comprising:

a second multiplexer connected to the second storage unit for selectively adding the value N for the context to the value B for the context, subtracting the value N for the context from the value B for the context, or adding the residual value to the value B for the context.

42. An image decoder system wherein for each pixel in a compressed image there is a context based on the pixels that have been decoded prior to the each pixel, the decoder comprising:

a. means for retrieving encoded pixels of a compressed image;

b. a decompressed image buffer for storing a portion of at least one decompressed digitized image;

c. a context generator connected to the decompressed image buffer and operable to determine the value of a context of a pixel being decoded;

d. a context quantizer operable to compute a quantized context for the pixel being decoded;

e. a storage unit connected to the context quantizer and operable to store a count N of occurrences of each quantized context and an accumulation of magnitudes of prediction residuals A for pixels in each context;

f. a Golomb code parameter generator connected to the storage unit and the context quantizer and operable to compute a Golomb parameter m as a function of the value N and the value A for the context of the pixel being decoded;

g. a code decoder connected to the means for retrieving encoded pixels to obtain a Golomb code for the pixel being decoded and to the Golomb code parameter generator and operable to produce a prediction residual value for the pixel being decoded;

h. a predictor for predicting the value of the pixel being decoded; and i. an adder connected to the code decoder to obtain the prediction residual value for the pixel being decoded and connected to the predictor to obtain the predicted value, and operable to add the prediction residual value to the predicted value, thereby producing a decoded value for the pixel.

43. The image compression decoder system of claim 42 wherein the Golomb code parameter generator generates the Golomb parameter m using instructions equivalent to a C language statement comprising:

```
for (k=0; (N<<k)<A; k++); and
```

wherein $m=2^k$.

44. The image compression decoder system of claim 43 wherein the Golomb code parameter generator for a special context generates the Golomb parameter m using instructions equivalent to C language statements comprising:

```
for (k=0; (N<<k)<A; k++);

if (k≠0)k--; and
```

wherein $m=2^k$.

45. The image compression decoder system of claim 43 wherein the Golomb code parameter generator further comprises:

a circuit for generating the Golomb parameter m, the operation of the circuit being defined by the C language statements:

```
for (k=0; (N<<k)<A; k++); and
```

wherein $m=2^k$.

46. The image compression decoder system of claim 43 wherein the Golomb code parameter generator further comprises:

a first comparator having an output $k_0$ and operable to compare the length of N to the length of A, and if the length of A is greater than the length of N, setting the output $k_0$ to the difference in the length of A and the length of N, otherwise the output $k_0$ to zero (0);

a shift register for storing the value N connected to $k_0$ and operable to left shift N $k_0$ times, thereby outputting a quantity $N<<k_0$;

a second comparator connected to the quantity $N<<k_0$ and to A, and operable to output a one (1) if $N<<k_0$ is less than A, otherwise to output a zero (0); and an adder connected to the quantity $k_0$ and to the output of the second comparator, and operable output the quantity k equal to the sum of $k_0$ and the output of the second comparator.

47. The image compression encoder system of claim 43 wherein the Golomb code parameter generator generates the Golomb parameter m using instructions equivalent to a C language statement comprising:

```
for (k'=0; (N'<<k')<A'; k'++);
```

wherein m is an integer close to $(2^{1/q})^{k'}$, $N'=N^q$, $A'=A^q$, and q is a positive integer.

48. The image compression encoder system of claim 43, further having bias cancellation circuitry comprising:

a first storage unit for maintaining an occurence count N for each context;

a second storage unit for maintaining an accumulation of prediction residuals B for each context;

a third storage unit for maintaining a correction value C for each context;

a first multiplexer connected to the third storage unit for selectively causing the value C for each context to be incremented, decremented or left unchanged;

an adder connected to a predicted value for the pixel to be encoded and to the third storage unit and operable to cause the value C for the context of the pixel to be added to the predicted value for the pixel, thereby producing a corrected predicted value;

a subtractor connected to the pixel value and to the corrected predicted value to produce a prediction residual; and a control circuit connected to accept the value B and the value N as inputs and to connected to the first multiplexer to select whether the value C for each context to be incremented, decremented or left unchanged based on the value B and the value N for the context.

49. The image compression encoder system of claim 48 further comprising:

a second multiplexer connected to the second storage unit for selectively adding the value N for the context to the value B for the context, subtracting the value N for the context from the value B for the context, or adding the residual value to the value B for the context.

50. A method of operating a computer to decompress encoded digitized images comprising the steps of:

a. retrieving a compressed image to decompress from an input device;

b. for each pixel to be decompressed from the compressed image:

i. directing the computer to determine a context for the pixel from previously decompressed pixels;

ii. directing the computer to use the context of a pixel in the decompressed image to determine a predicted value for the pixel;

iii. retrieving a Golomb code for the pixel from the compressed image;

iv. computing a Golomb parameter corresponding to a context-specific value N and a context-specific value A, where N is a count of pixels encountered in the context, and A is an accumulation of magnitudes of prediction residuals for pixels in the context;

v. decoding the Golomb code using the Golomb parameter, thereby producing a mapped value, $M(\epsilon)$;

vi. mapping the mapped value $M(\epsilon)$ to a residual value $\epsilon$ vii. and adding the residual value $\epsilon$ to the predicted value, thereby producing the decoded value for the pixel.

51. The method of claim 50, wherein the mapping $M(\epsilon)$ is an alphabet of decodable events, the method further comprising the step of:

defining a first special context; and when processing a pixel that occurs in the first special context, decoding using a Golomb code an event that is an extension of the alphabet of decodable events.

52. The method of claim 51 wherein the alphabet extension is a length of consecutive constant values.

53. The method of claim 52 wherein the consequtive constant values are consecutive constant prediction residuals, the method further comprising:

the step of ranking the lengths of consecutive constant prediction residuals by occurrence counts; and for an occurrence of a length r of consecutive constant prediction residuals, decoding the length as a Golomb code for the rank of the length, i(r).

54. The method of claim 53 wherein the step of decoding the rank of the length i(r) as a Golomb code, further comprises the steps of:

determining a Golomb parameter k by executing instructions equivalent to the C statements:

```
for (k=0; (N<<k)<=A;k++);
if (k≠0)k--;
```

decoding the rank of the length i(r) as a first portion and as a second portion, said first portion being a binary representation of i(r) mod m and the second portion being a unary representation of $\lfloor i(r)/m \rfloor$, where $m=2_k$.

55. The method of claim 52 further comprising the steps of:

definining a second special context;

when decoding a pixel immediately following the decoding of an event in the first special context:

decoding the pixel immediately following the decoding of an event in the first special context using a Golomb parameter obtained from values A and N for the second special context; and updating the values A and N for the second special context.

56. The method of claim 55 wherein the constant values are constant pixel values; and a pixel occurring in the second special context is the first pixel following the decoding of a run of constant pixel values.

57. The method of claim 50, wherein the prediction residuals in an image have a distribution, and further comprising the step of:

cancelling biases in the distribution of prediction residuals in images being decompressed by adjusting the distribution of prediction residuals to a distribution matched to Golomb encoding and the mapping M(ε).

58. A computer storage media having computer executable instructions for controlling the operation of a computer to compress digitized images, comprising:

instructions for causing said computer to, for each pixel in the image:

i. determine a context for the pixel;

ii. use the context of a pixel in the image to determine a predicted value for the pixel;

iii. compare the predicted value and the actual value, thereby producing a residual value ε, iv. map the residual value ε to a mapped value M(ε); and v. compute a Golomb code corresponding to the residual from a context-specific value N and a context-specific value A, where N is a count of pixels encountered in the context, and A is an accumulation of magnitudes of prediction residuals for pixels in the context.

59. A computer storage media having computer executable instructions for controlling the operation of a computer to decompress compressed digitized images, comprising:

instructions for causing said computer to, for each encoded pixel in the compressed digitized image:

i. determine a context for the pixel;

ii. use the context of a pixel in the image to determine a predicted value for the pixel;

iii. retrieve a Golomb code from the compressed digitized image;

iv. determining a Golomb code parameter from the context using a context-specific value N and a context-specific value A, where N is a count of pixels encountered in the context, and A is an accumulation of magnitudes of prediction residuals for pixels in the context;

v. decoding the retrieved Golomb code using the Golomb code parameter, thereby obtaining a mapped prediction residual M(ε);

vi. map M(ε) to a prediction residual ε; and vii. add the prediction residual ε to the predicted value, thereby producing a decompressed pixel value.

* * * * *